US011558354B2

(12) United States Patent
Mestery et al.

(10) Patent No.: US 11,558,354 B2
(45) Date of Patent: Jan. 17, 2023

(54) EFFICIENT PROTECTION FOR A VIRTUAL PRIVATE NETWORK

(71) Applicant: Cisco Technology, Inc., San Jose, CA (US)

(72) Inventors: Kyle Mestery, Woodbury, MN (US); Graham Bartlett, Plymouth (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 274 days.

(21) Appl. No.: 16/849,251

(22) Filed: Apr. 15, 2020

(65) Prior Publication Data

US 2020/0336465 A1  Oct. 22, 2020

(30) Foreign Application Priority Data

Apr. 16, 2019 (GB) ...................................... 1905405

(51) Int. Cl.
*H04L 9/40* (2022.01)
*H04L 12/46* (2006.01)
*H04L 47/34* (2022.01)

(52) U.S. Cl.
CPC ...... *H04L 63/0272* (2013.01); *H04L 12/4641* (2013.01); *H04L 47/34* (2013.01);
(Continued)

(58) Field of Classification Search
CPC . H04L 12/4641; H04L 63/164; H04L 63/166; H04L 63/0272; H04L 47/34; H04L 63/0263; H04L 63/08; H04L 2212/00
(Continued)

(56) References Cited

U.S. PATENT DOCUMENTS 8,223,770 B2    7/2012  Wray et al.
8,572,380 B2 * 10/2013  Futagami .............. H04L 65/762
                                                          725/135
(Continued)

FOREIGN PATENT DOCUMENTS

KR    20170041614 A    4/2017
KR      101823421 B1    1/2018
WO     2017120512 A1    7/2017

OTHER PUBLICATIONS

Son, Jeongseok et al., "Protego: Cloud-Scale Multitenant IPsec Gateway", https://www.usenix.org/conference/atc17/technical-sessions/presentation/son, 2017 USENIX Annual Technical Conference (USENIX ATC '17), ISBN 978-1-931971-38-6, Jul. 12-14, 2017, 15 pages.

(Continued)

*Primary Examiner* — Benjamin A Kaplan
(74) *Attorney, Agent, or Firm* — Edell, Shapiro & Finnan, LLC

(57) ABSTRACT

Techniques are described to provide efficient protection for a virtual private network. In one example, a method is provided that includes obtaining a packet at a first network entity; determining that the packet is a packet type of an authentication type; determining whether authentication content for the packet matches known good criteria for the packet type of the authentication type; based on determining that the authentication content for the packet does not match the known good criteria, performing at least one of dropping the packet and generating an alarm; and based on determining that the authentication content for the packet does match the known good criteria, processing the packet at the first network entity or forwarding the packet toward a second network entity.

20 Claims, 7 Drawing Sheets

(52) U.S. Cl.
CPC .......... *H04L 63/0263* (2013.01); *H04L 63/08* (2013.01); *H04L 63/164* (2013.01); *H04L 63/166* (2013.01); *H04L 2212/00* (2013.01)

(58) Field of Classification Search
USPC .......................................................... 726/15
See application file for complete search history.

(56) References Cited

U.S. PATENT DOCUMENTS

| | | | |
|---|---|---|---|
| 9,712,440 | B2 | 7/2017 | Koodli et al. |
| 9,742,626 | B2 | 8/2017 | Ramachandran et al. |
| 2003/0235308 | A1* | 12/2003 | Boynton ................. H04L 63/08 380/270 |
| 2004/0177106 | A1 | 9/2004 | Rose et al. |
| 2010/0169645 | A1* | 7/2010 | McGrew ............... H04L 9/0637 380/268 |
| 2011/0004913 | A1 | 1/2011 | Nagarajan et al. |
| 2012/0198541 | A1 | 8/2012 | Reeves |
| 2014/0376559 | A1* | 12/2014 | Diwane ................... H04L 45/02 370/401 |
| 2015/0288603 | A1* | 10/2015 | Kandasamy ........ H04L 12/4633 370/392 |
| 2017/0201537 | A1* | 7/2017 | Caldwell ............. H04L 63/1416 |
| 2017/0374025 | A1 | 12/2017 | Pan |

OTHER PUBLICATIONS

Cisco, "ASA VPN Load Balancing Master Election Process", Document ID: 118078, Aug. 1, 2014, 4 pages.
Cisco Systems, Inc., "VPN Availability Configuration Guide", Jul. 11, 2011, 48 pages.
Cisco Systems, Inc., "CLI Book 1: Cisco ASA Series General Operations CLI Configuration Guide, 9.10", Jan. 30, 2020, 1358 pages.
Cisco Systems, Inc., "Security for VPNs with IPsec Configuration Guide, Cisco IOS XE Release 3S", Sep. 2, 2018, 108 pages.
Cisco Systems, Inc., "CLI Book 3: Cisco ASA Series VPN CLI Configuration Guide, 9.10", Oct. 16, 2019, 460 pages.
Cisco, "Setting General VPN Parameters", Chapter 62, Cisco ASA 5500 Series Configuration Guide using the CLI, OL-20336-01, downloaded Apr. 14, 2020, 18 pages.
Donenfeld, Jason A., "WireGuard: Next Generation Kernel Network Tunnel", www.wireguard.com, Document ID: 4846ada1492f5d92198df154f48c3d54205657bc, Jun. 30, 2018, 20 pages.
Edgesecurity, "Protocol & Cryptography", https://www.wireguard.com/protocol/, downloaded Apr. 6, 2020, 9 pages.
Prince, Matthew, "Introducing Warp: Fixing Mobile Internet Performance and Security", https://blog.cloudflare.com/1111-warp-better-vpn/, Apr. 1, 2019, 26 pages.
Prince, Matthew, "WARP is here (sorry it took so long)", https://blog.cloudflare.com/announcing-warp-plus/, Sep. 25, 2019, 21 pages.
OmniSecu, "IKEv1 Protocol, IKEv1 message exchange, IKEv1 Main, Aggressive and Quick Modes", https://www.omnisecu.com/tcpip/ikev1-main-aggressive-and-quick-mode-message-exchanges.php, downloaded Apr. 9, 2020, 16 pages.
Cisco, "Virtual Private Network (VPN)", https://www.cisco.com/c/m/en_za/solutions/vpn.html, downloaded Mar. 24, 2020, 1 page.
Snort, "Network Intrusion Detection & Prevention System", https://www.snort.org/, downloaded Mar. 17, 2020, 9 pages.
T. Kivinen et al., "Signature Authentication in the Internet Key Exchange Version 2 (IKEv2)", Internet Engineering Task Force (IETF), Request for Comments: 7427, Updates: 7296, Category: Standards Track, ISSN: 2070-1721, Jan. 2015, 18 pages.
V. Smyslov, "Internet Key Exchange Protocol Version 2 (IKEv2) Message Fragmentation", Internet Engineering Task Force (IETF), Request for Comments: 7383, Category: Standards Track, ISSN: 2070-1721, Nov. 2014, 20 pages.
C. Kaufman et al., "Internet Key Exchange Protocol Version 2 (IKEv2)", Internet Engineering Task Force (IETF), Request for Comments: 7296, STD: 79, Obsoletes: 5996, Category: Standards Track, ISSN: 2070-1721, Oct. 2014, 142 pages.
E. Rescorla et al., "Datagram Transport Layer Security Version 1.2", Internet Engineering Task Force (IETF), Request for Comments: 6347, Obsoletes: 4347, Category: Standards Track, ISSN: 2070-1721, Jan. 2012, 32 pages.
C. Kaufman et al., "Internet Key Exchange Protocol Version 2 (IKEv2)", Internet Engineering Task Force (IETF), Request for Comments: 5996, Obsoletes: 4306, 4718, Category: Standards Track, ISSN: 2070-1721, Sep. 2010, 138 pages.
T. Dierks et al., "The Transport Layer Security (TLS) Protocol Version 1.2", Network Working Group, Request for Comments: 5246, Obsoletes: 3268, 4346, 4366, Updates: 4492, Category: Standards Track, Aug. 2008, 104 pages.
C. Kaufman, Ed., "Internet Key Exchange (IKEv2) Protocol", Network Working Group, Request for Comments: 4306, Obsoletes: 2407, 2408, 2409, Category: Standards Track, Dec. 2005, 99 pages.
P. Hoffman, "Algorithms for Internet Key Exchange version 1 (IKEv1)", Network Working Group, Request for Comments: 4109, Updates: 2409, Category: Standards Track, May 2005, 5 pages.
D. Harkins et al., "The Internet Key Exchange (IKE)", Network Working Group, Request for Comments: 2409, Category: Standards Track, Nov. 1998, 41 pages.
International Search Report and Written Opinion in counterpart International Application No. PCT/US2020/028252, dated Jul. 13, 2020, 26 pages.
V. Devarapalli et al., "Redirect Mechanism for the Internet Key Exchange Protocol Version 2 (IKEv2)", Network Working Group, Request for Comments: 5685, Nov. 2009, 15 pages.
A. Freier et al., "The Secure Sockets Layer (SSL) Protocol Version 3.0", Internet Engineering Task Force (IETF), Request for Comments: 6101, ISSN: 2070-1721 Aug. 2011, 67 pages.
R. Barnes et al., "Deprecating Secure Sockets Layer Version 3.0", Internet Engineering Task Force (IETF), Request for Comments: 7568, ISSN: 2070-1721, Jun. 2015, 7 pages.
E. Rescorla et al., "The Transport Layer Security (TLS) Protocol Version 1.3", Internet Engineering Task Force (IETF), Request for Comments: 8446, ISSN: 2070-1721, Aug. 2018, 160 pages.
SquareLemon Blog, "FingerPrintTLS", https://blog.squarelemon.com/fingerprintls/, Aug. 2, 2016, 3 pages.
Crenshaw, Adrian, "Fix Me01 Stealthier Attacks and Smarter Defending With TLS Fingerprinting lee Brotherston", Sep. 25, 2015, https://www.youtube.com/watch?v=XX0FRAy2Mec, 1 page.
SquareLemon Blog, "quick and dirty crapware analysis ids rule creation foo", Mar. 4, 2015, https://blog.squarelemon.com/2015/03/quick-and-dirty-crapware-analysis-ids-rule-creation-foo/, 5 pages.
LeeBrotherston, "snort_interception.rules", Mar. 4, 2015, https://github.com/LeeBrotherston/snort/blob/master/snort_interception.rules, 2 pages.
Meng, Weizhi et al., "Enhancing List-Based Packet Filter Using IP Verification Mechanism against IP Spoofing Attack in Network Intrusion Detection", https://www.researchgate.net/publication/259258623_Enhancing_List-Based_Packet_Filter_Using_IP_Verification_Mechanism_against_IP_Spoofing_Attack_in_Network_Intrusion_Detection, Nov. 2012, 4 pages.
Etalle, Dr. Sandro et al., "Self-con guring deep protocol network whitelisting", Version 2.1, https://cdn2.hubspot.net/hubfs/2951224/Security_Matters-March2017/PDF/whitepaper_ics_US.pdf?t=1492012518084, Sep. 15, 2014, 28 pages.
Inliniac, "Vuurmuur 0.8 has been released", https://blog.inliniac.net/tag/suricata/, Feb. 24, 2019, 19 pages.
Roesch, Martin, "Writing Snort Rules", Version 1.7, https://paginas.fe.up.pt/~mgi98020/pgr/writing_snort_rules.htm#dsize, downloaded May 19, 2020, 28 pages.
CounterSnipe Systems LLC., "Writing your own rules with Version 8.x.x", www.countersnipe.com/support/cs-writing-rules.pdf, Mar. 2015, 9 pages.
Robbins, Colin, "Validating the Payload", https://www.nexor.com/validating-the-payload/, Nov. 2014, 5 pages.
Phil, "Cross-Domain Gateway Functions", https://blog.blackswansecurity.com/2013/12/cross-domain-gateway-functions/, Dec. 20, 2013, 15 pages.
Wireshark Foundation, "Internet Security Association and Key Management Protocol", Protocol field name: isakmp, Versions: 1.0.0 to 3.2.3, https://www.wireshark.org/docs/dfref/i/isakmp.html, downloaded May 19, 2020, 30 pages.
Stuart 'stu-h', "zeek-plugin-ikev2", https://github.com/ukncsc/zeek-plugin-ikev2, Aug. 20, 2019, 3 pages.

(56) References Cited

OTHER PUBLICATIONS

Australian Cyber Security Centre (ACSC), "Fundamentals of Cross Domain Solutions", https://www.cyber.gov.au/publications/fundamentals-of-cross-domain-solutions, Dec. 4, 2019, 44 pages.
Wikipedia, "Guard (information security)", https://en.wikipedia.org/wiki/Guard_(information_security), Jan. 30, 2020, 4 pages.
Bejtlich, Richard, "Using Corelight to Monitor and Identify Exploited VPNs", Bright Ideas Blog, https://corelight.blog/2019/10/02/using-corelight-to-monitor-and-identify-exploited-vpns/, Oct. 2, 2019, 16 pages.
Benparker, "Detecting TLS 1.0 and TLS 1.1 Protocol", https://live.paloaltonetworks.com/t5/custom-signatures/detecting-tls-1-0-and-tls-1-1-protocol/td-p/192889, Dec. 22, 2017, 3 pages.
WatchGuard Technologies, Inc., "Configure IPS Exceptions", https://www.watchguard.com/help/docs/fireware/12/en-US/Content/en-US/services/ips/ips_config_exceptions_c.html, 2018, 1 page.
Search Report in counterpart European Application No. GB1905405.5, dated Oct. 29, 2019, 4 pages.
Examination Report in counterpart European Application No. GB1905405.5, dated Jul. 22, 2022, 4 pages.
"IPv4 Packet Header," Cisco, CCNA Routing & Switching ICND1 100-105, https://networklessons.com/cisco/ccna-routing-switching-icnd1-100-105/ipv4-packet-header, retrieved from the Internet on Jul. 25, 2022, 3 pages.

* cited by examiner

EXAMPLE IKE_SA_INIT MESSAGE
170

Frame 1: 260 bytes on wire (2080 bits)
Internet Protocol Version 4
  0100 .... = Version: 4
  .... 0101 = Header Length: 20 bytes (5)
  <removed>                                            } IP HEADER 171

User Datagram Protocol, Src Port: isakmp (500), Dst Port: isakmp (500)
  Source Port: isakmp (500)
  Destination Port: isakmp (500)
  <removed>                                            } UDP HEADER 172

Internet Security Association and Key Management Protocol
  Initiator SPI: e5226549efa525e2
  Responder SPI: 0000000000000000
  Next payload: Security Association (33)
  Version: 2.0
    0010 .... = MjVer: 0x2
    .... 0000 = MnVer: 0x0
  Exchange type: IKE_SA_INIT (34)
  Flags: 0x08 (Initiator, No higher version, Request)
    .... 1... = Initiator: Initiator                   } AUTHENTICATION
    .... .0.. = Version: No higher version               HEADER 174
    .... ..0. = Response: Request                        (IKEv2 HEADER)
  Message ID: 0x00000000
  Length: 232
  Data                                                 } AUTHENTICATION
  ......                                                 DATA 175
  ......                                                 (IKEv2 DATA)

AUTHENTICATION
CONTENT 173
(IKEv2 HEADER + IKEv2 DATA)

FIG.1B

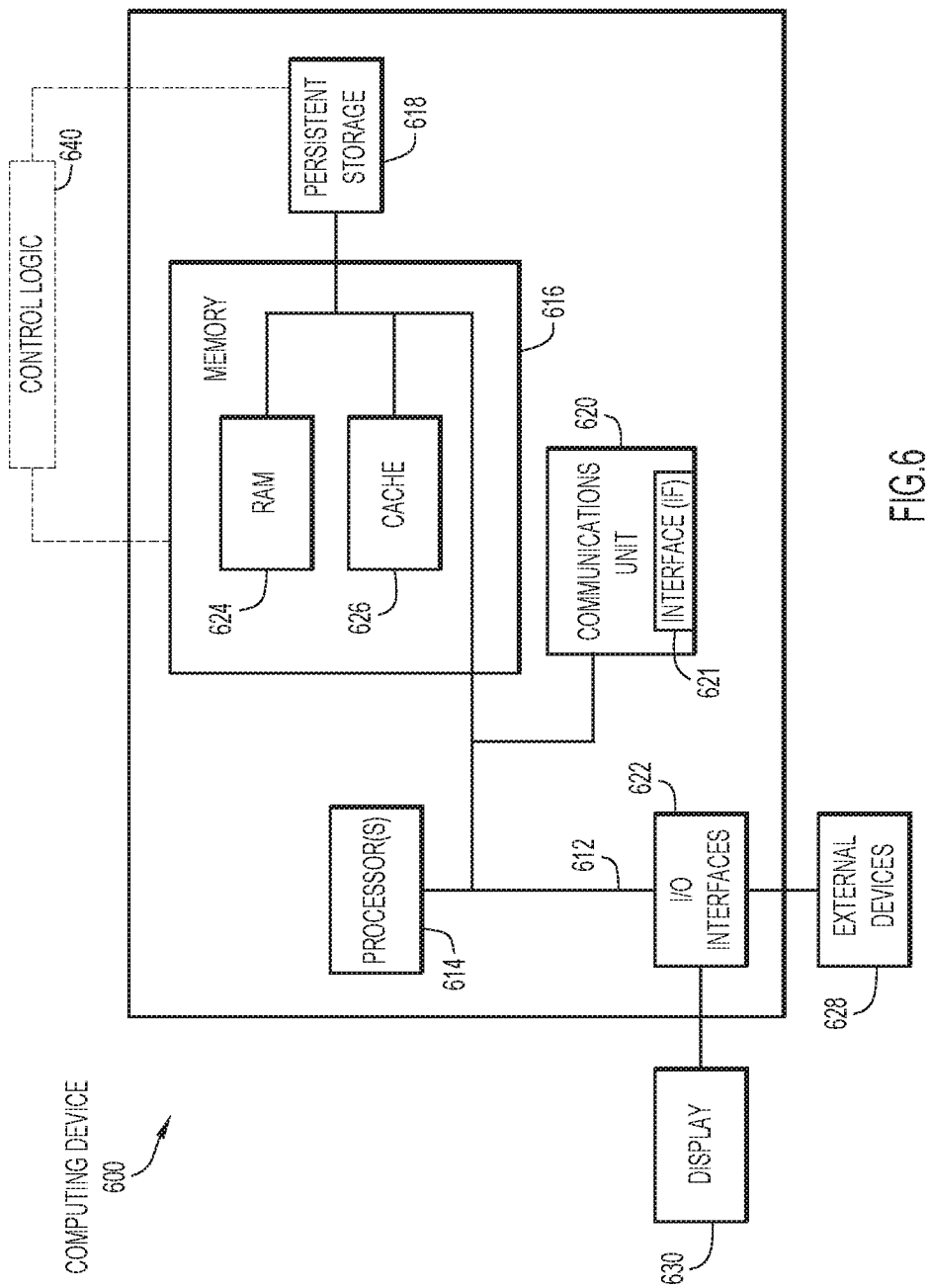

EFFICIENT PROTECTION FOR A VIRTUAL PRIVATE NETWORK

CROSS-REFERENCE TO RELATED APPLICATION

This application claims priority to Great Britain Patent Application GB1905405.5 entitled "EFFICIENT PROTECTION FOR AN IKEv2 DEVICE," filed on Apr. 16, 2019, the disclosure of which application is hereby incorporated by reference in its entirety.

TECHNICAL FIELD

The present disclosure relates to network equipment and services.

BACKGROUND

Virtual Private Network (VPN) head ends can be built using gateways such as gateway devices or services. Such gateways or firewalls/systems designed to protect them can be susceptible to various forms of attacks since they are exposed to the public Internet. A malicious actor can exploit such gateways by exposing vulnerabilities in communication protocols for traffic handled by the gateways.

BRIEF DESCRIPTION OF THE DRAWINGS

FIG. 1B is a schematic diagram illustrating example details associated with an example Internet Key Exchange version 2 (IKEv2) packet that may be utilized in the system of FIG. 1A, according to an example embodiment.

FIG. 6 is a hardware block diagram of a computing device that may perform functions for providing efficient protection for a VPN, in connection with the techniques depicted in FIGS. 1A-5.

DESCRIPTION OF EXAMPLE EMBODIMENTS

Overview

Figure 1A:
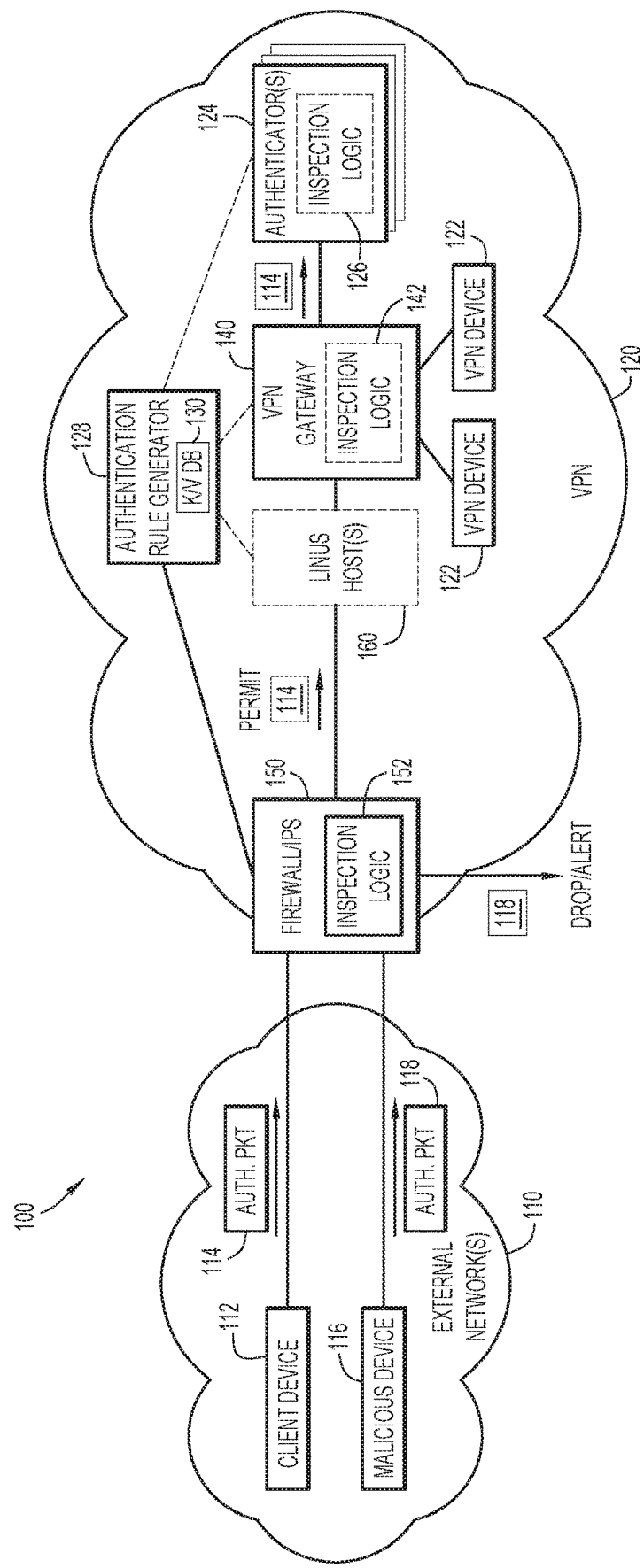
FIG. 1A is a block diagram of a system in which techniques may be implemented to provide efficient protection for a Virtual Private Network (VPN), according to an example embodiment.

Presented herein are techniques to provide for the efficient protection of a Virtual Private Network (VPN), which can include any combination of VPN services, network entities, gateway devices, and/or gateway services, by propagating authentication rules or signatures based on known good criteria for known good authentication packets to any combination of VPN network entities, such as gateways (e.g., services and/or devices), firewall services/devices, Intrusion Prevention System (IPS) services/devices, Linux hosts, and/ or authentication systems. Such techniques may allow for provisioning a known whitelist of allowed authentication packets with a default drop policy, thereby, facilitating efficient authentication protection of VPN network entities such as services, devices, etc.

In an example embodiment, a method is provided that includes obtaining a packet at a first network entity; determining that the packet is a packet type of an authentication type; determining whether authentication content for the packet matches known good criteria for the packet type of the authentication type; based on determining that the authentication content for the packet does not match the known good criteria, performing at least one of dropping the packet and generating an alarm; and based on determining that the authentication content for the packet does match the known good criteria, processing the packet at the first network entity or forwarding the packet toward a second network entity.

Example Embodiments

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Discussions of protocols and processing techniques as described herein may refer to layers of a multi-layered scheme such as the Open Systems Interconnection (OSI) Model (e.g., Layers 1-7), or any derivations or variants thereof. Traffic processing operations may also be discussed in reference to a protocol stack, which may also be referred to as a network stack, a host stack, and variations thereof, and may provide packet processing operations for one or more layers. Internet Protocol (IP) addresses discussed herein and in the claims can include IP version 4 (IPv4) and/or IP version 6 (IPv6) addresses.

Virtual Private Network (VPN) head ends can be built using gateway devices (such as a Cisco® Adaptive Security Appliance (ASA)) or as a service offering (such as a Cisco® Secure Internet Gateway (SIG)). These offerings provide VPN capabilities to organizations using technologies such as IP Security (IPsec) (which may utilize Internet Key Exchange (IKE) version 1 (IKEv1) or IKE version 2 (IKEv2) for authentication), Secure Sockets Layer (SSL) Transport Layer Security (TLS) or Datagram TLS (DTLS)

VPNs, and/or any other VPN security protocol now known here (e.g., WireGuard®, etc.) and/or hereafter developed. These VPNs typically provide remote access for client devices belonging to an organization and/or third-party devices desiring access to resources associated with a VPN, among other things. Cisco® is a registered trademark of Cisco Technology, Inc. WireGuard® is a registered trademark of Jason A. Donenfeld.

VPN gateways, whether implemented as devices or services, are susceptible to various forms of attacks since they are to be exposed to the public Internet and typically utilize a firewall and/or IPS device/service to protect them. Such protection is often utilized because the gateways/devices/services themselves can be subject to attacks to protocols themselves. A malicious actor could exploit a VPN gateway (services or device) to compromise it by exposing a vulnerability in the protocols of traffic handled by the gateway.

For example, with IKE, there are many known attacks against the IKEv2 protocol stack, which can be mitigated in current systems by IPS functionality. Current IPS functionality involves signatures that are to be up-to-date and does not mitigate against zero-day attacks, where no signature exists. Current protection processing involved with modern IPS devices is to detect traffic (e.g., packets/packet flows) that is bad (using signatures or perhaps Artificial Intelligence (AI), Machine Learning (ML), etc.), and drop the identified bad traffic.

Provided herein are techniques that identify/distinguish and allow known good authentication handshake traffic (e.g., known good packets) to be permitted, while dropping bad or malicious authentication traffic. In effect, techniques herein flip the mitigation ability to only allow known good authentication attempts. Thus, techniques provided herein are contrary to current protection methods implemented in systems today that only detect malicious traffic while allowing everything else.

Accordingly, techniques presented herein may provide several advantages over current protection methods. In one example, advantages of techniques presented herein may enable smaller lookup tables to be utilized for determining known good packets for an authentication type as opposed to determining bad packets. When using an "inspect everything for bad packets" approach, the tables maintained are constantly evolving and updating in order to determine what is bad. In contrast, techniques herein involve a system in which only authentication rules/signatures based on authentication content for known good authentication traffic (packets) may be maintained, thereby significantly shortening the amount of comparisons of inbound traffic in order to determine whether traffic should be allowed, and dropping or alerting all the traffic not matching the good criteria.

In another example, advantages of techniques presented herein may facilitate quick updates quick updates of the signatures as new allowed signatures are added to a rules/signature database. During operation, the database can be quickly updated with new "good traffic" signatures, thereby allowing for the quick incorporation of new signatures into inspection logic, etc. for identifying known good authentication traffic.

Referring to FIG. 1A, FIG. 1A is a block diagram of a system 100 in which techniques may be implemented to provide efficient protection for a VPN 120, according to an example embodiment. System 100 includes a VPN 120 and one or more external network(s) 110. FIG. 1B is a schematic diagram illustrating example details associated with an example IKEv2 IKE_SA_INIT packet/message 170 that may be utilized in the system of FIG. 1A, according to an example embodiment. FIG. 1B may be discussed herein with reference to FIG. 1A.

External network(s) 110 may include any number of client device(s) 112 that may seek connection one or more VPN device(s) 122 of VPN 120. However, malicious device(s) 116 may also be present within external network(s) 110 and may seek to penetrate the VPN 120 for a malicious intent.

VPN 120 may include any number of network entities including, but not limited to, one or more VPN device(s) 122, one or more authenticator(s) 124 (also referred to herein interchangeably as authentication devices/services), an authentication rule generator 128, a firewall and/or IPS device or service 150 (generally referred to as firewall/IPS 150), and a VPN gateway 140. Firewall/IPS may include inspection logic 152 and authentication rule generator 128 may include a key-value store or database (K/V DB) 130. In some instances, VPN gateway 140 may be configured with inspection logic 142 and/or any number of authenticator(s) 124 may be configured with corresponding inspection logic 126. In some instances, VPN 120 may further be configured with one or more Linux host(s) 160, which may represent any network entity handling traffic in VPN (e.g., servers, routers, switches, gateways, load balancers, etc.).

Firewall/IPS 150 may interface with VPN gateway 140, which may further interface with authenticator(s) 124 and VPN device(s) 122. In some instances, one or more Linux host(s) may facilitate interfacing firewall/IPS 150 and VPN gateway 140 (as shown in FIG. 1A) and/or may facilitate connections between any other network entities of VPN 120. Authentication rule generator 128 may interface with different network entities of VPN 120, depending on implementation. For example, for the embodiment of FIG. 1A, authentication rule generator 128 may interface with firewall/IPS 150; however, for other embodiments, authentication rule generator 128 may interface with any combination of firewall/IPS 150, VPN gateway 140, authenticator(s) 124, and/or Linux host(s) 160.

External network(s) 110 may be the public Internet and/or any other public network. VPN 120 may be a private network deployed among any combination of public network infrastructure(s). VPN 120 can overlap in whole and/or in part with any number public networks, including but not limited to external network(s) 110. Generally, a VPN, such as VPN 120, may facilitate a virtual private network for an organization (e.g., a business entity, a government entity, etc.) that facilitates secure connections among client/VPN devices 112/122, which can protect data (packets) traversing VPN 120 from unauthorized access and may provide other benefits (e.g., flexible/remote connectivity, dedicated Wide Area Network (WAN)/Software Defined WAN (SD-WAN) links, etc.).

In various embodiments, VPN 120 may be inclusive of any combination of a VPN, Ethernet VPN (EVPN), Virtual Private Local Area Network (LAN) Service (VPLS), Virtual Extensible LAN (VXLAN), and/or the like. Generally, firewall/IPS 150 may inspect traffic (packets) from external network(s) 110 in order to protect VPN 120 from attacks, exploits, worms, viruses, and/or any other security threats. Although illustrated in FIG. 1A as a single entity, it is to be understood that VPN gateway 140 may be representative of any number of VPN gateway devices/services associated with VPN 120. Generally, VPN gateway 140 provides a secure mechanism to couple VPN 120 to external network(s) 110. Although illustrated in FIG. 1A as a single entity, it is to be understood that VPN gateway 140 may be representative of any number of VPN gateway devices/services associated with VPN 120.

In various embodiments, authenticator(s) 124 may facilitate authentication services for one or more authentication types, such as IKEv1, IKEv2, SSL (TLS or DTLS), and/or any other VPN security protocol now known here (e.g., WireGuard®, etc.) and/or hereafter developed. Thus, authenticator(s) 124 may be implemented as any combination of an IKEv1/v2 authenticator, SSL authenticator (inclusive of an SSL TLS or DTLS authenticator), and/or any other VPN security protocol authenticator. In various embodiments, VPN device(s) 122 may be any compute device(s) associated with VPN 120.

In at least one embodiment, authentication rule generator 128 may be a computing device and/or logic implemented for a computing device that may generate one or more authentication rules (also referred to herein as 'signatures') that are to be utilized (e.g., by firewall/IPS 150, etc.) to identify known good authentication packets for one or more authentication types. The authentication rules/signatures may be tailored for particular packet types of a corresponding authentication type. For example, in at least one embodiment, an authentication rule can be generated to identify known good IKEv2 authentication handshake packets, such as known good IKE_AUTH packets and known good IKE_SA_INIT packets. Various example details associated with authentication rules/signatures are discussed in further detail herein.

In some embodiments, different types of authentication rules may be generated and propagated to different network entities within VPN 120. For example, some rules for a certain authentication type may be tailored for inspecting traffic by firewall/IPS 150 while other rules for the certain authentication type may be tailored for inspecting traffic by Linux host(s) 160. Thus, embodiments herein can be applied to multiple VPN types (e.g., EVPN, VPLS, etc.) and can facilitate multiple mitigations across multiple network entities for a given deployment.

During operation in at least one embodiment, firewall/IPS 150 may facilitate the inspection of traffic via inspection logic 152 in order to identify known good authentication traffic and allows such traffic while alerting on bad authentication traffic in order to drop such bad traffic and/or generate a flag or other alarm indicating presence of such bad traffic. Broadly, techniques herein may involve detecting known good signatures of VPN authentication traffic before such traffic is handed off to and/or processed by the system (VPN 120) itself. Thus, during operation, techniques herein may involve obtaining a packet; identifying or determining that the packet is a packet type of a particular authentication type (e.g., IKEv1, IKEv2, SSL (TLS or DTLS), WireGuard®, etc.); matching or otherwise determining whether one or more criteria for the packet match known good criteria for the packet type of the authentication type (e.g., packet length and/or protocol specific parameters identified for known good rules/signatures); based on determining that the one or more criteria for the packet match the known good criteria, allowing the packet, which may include forwarding the packet toward a second network entity and/or otherwise processing the packet; and based on determining that the one or more criteria for the packet do not match the known good criteria, performing at least one of dropping the packet and generating an alarm and/or flag indicating. Once a packet is allowed, processing for a given authentication process corresponding to the authentication type can proceed in a normal manner.

Consider various examples, discussed below, involving IKEv2 authentication, as prescribed by Internet Engineering Task Force (IETF) Request For Comments (RFC) 7383 (https://tools.ietf.org/html/rfc7383). In at least one embodiment, techniques herein may provide efficient protection for an IKEv2 VPN network entity or device (e.g., VPN gateway 140) from malicious traffic that could be used to compromise the security of the VPN network entity or device. Although various example herein are discussed with reference to IKEv2, it is to be understood that any similar techniques described for IKEv2 can be implemented for any other authentication type (e.g., IKEv1, SSL (TLS or DTLS), WireGuard®, etc.). Thus, techniques herein may provide for the ability to correctly identify packet lengths for the authentication bits of different authentication types/protocols and allow good packets to proceed while dropping or otherwise alerting on invalid packets.

IKEv2 provides for the ability to securely establish an IPsec VPN, such as VPN 120. A secure tunnel can be established via IKEv2 using an IKE_SA_INIT exchange and after this, an initiator (e.g., a client device, etc.) can prove its identity in a subsequent IKE_AUTH exchange.

Many VPN gateways typically accept inbound traffic from any IP address, due to users of the VPN gateway connecting from various IP addresses that are not known. For example, an international company would commonly have to allow all IKEv2 traffic (which runs over User Datagram Protocol (UDP) port 500 and UDP port 4500) from any IP address in the world to the VPN gateway interface as clients of this gateway could be connecting from any geographical location.

Opening an IKEv2 gateway to traffic from any IP addresses can result in an un-authenticated device having the ability to send an IKE_SA_INIT and IKE_AUTH message to a VPN gateway prior to the VPN gateway authenticating the peer. This opens the possibility for a malicious actor to compromise the IKEv2 VPN gateway by exploiting a vulnerability in the IKE or related (Pairwise Key Infrastructure (PKI), as an example) daemons that process data in the IKE_SA_INIT or IKE_AUTH exchanges.

As the IKE_AUTH message exchange is encrypted and integrity protected, it limits the ability for network middle-box devices to inspect traffic within the exchange. Thus, using an IPS to inspect the signature of traffic contained in the IKE_AUTH exchange may not be possible, as IKEv2 prevents the ability to man-in-the-middle data flows.

There are many known attacks against the IKEv2 protocol stack, which are typically mitigated in current systems via IPS functionality. Such conventional IPS functionality operates based on signatures that are up-to-date and does not mitigate against zero-day attacks, where no signatures exists. Thus, the conventional operating mode for current, modern IPS is to detect what is bad (using signatures or maybe some form of AI or ML) and drop this identified bad traffic.

Embodiments herein provide that known good VPN handshake traffic is permitted and everything else is dropped. This is contrary to other methods conventionally implemented today that instead aim to detect malicious traffic and allow everything else.

During operation, an authentication rule for known good traffic can be generated by obtaining a snapshot of a known good authentication message (packet) for an authentication type (e.g., an IKE_SA_INIT message and an IKE_AUTH message for IKEv2) and identifying various known good criteria for the known good packet, such the size or length of authentication content for the packet in addition to other unique values or authentication content parameters for known good traffic (e.g. vendor identifier (ID) payload, nonce size, etc.). For example, with regard to IKEv2, RFC 4306 identifies nonces that can be between 16 and 256 octets. A Vendor ID payload can be utilized that contains a vendor defined constant. Thus, the known good length and other unique values or authentication content parameters may be considered known good packet criteria for identifying good packets of a packet type (e.g., IKE_SA_INIT, IKE_AUTH, ClientHello, etc.) for an authentication type (e.g., IKEv2, IKEv1, SSL TLS, SSL DTLS, WireGuard®, etc.).

If all clients are identically configured, as is commonly found for enterprise networks (e.g., certificates of clients being generated in an automated fashion so that the all certificates have the same size and structure) and are running the same software, then the size and structure of the IKEv2 header and data will be static for all legitimate clients. Known good packet criteria such as size/length of the authentication content can be used in addition to one or more IKEv2 header attribute(s) that can be inspected in the clear (e.g., not being encrypted) by en-route network devices to create firewall/filtering rules for known good authentication traffic, also referred to herein interchangeably as 'authentication rules' or 'signatures'.

In some embodiments, it may be possible for clients (e.g., client device 112) to be grouped into several logical containers (e.g., groups such as routers, Windows® clients, MAC® Operating System (OS) clients, etc.) for which there may be intra-group homogeneity in the IKEv2 protocol stack for each group.

In the IKEv2 example, such firewall/filtering (authentication) rules can be used to filter for IKE_SA_INIT and IKE_AUTH messages of the known good certain (header) size/length. Any other IKE_SA_INIT or IKE_AUTH messages that do not conform to this known good size can be alerted on, and in an aggressive environment silently dropped or discarded.

In some embodiments, such techniques may allow for network middleboxes (e.g., Linux host(s) 160) to implement these simple filtering rules in order to only permit legitimate IKE_SA_INIT and IKE_AUTH traffic based on known good packet sizes.

Filtering on known good packet (authentication content) sizes would mean that an attacker (e.g., malicious device 116) would have to craft an exploit that is correctly parsed by the IKE daemon (processing), that is exactly the size of the known good size for the VPN client(s) using a particular VPN gateway, such as VPN gateway 140. This may greatly reduce the attack surface, without having to implement one or more of:

1. Expensive tooling that attempts to inspect the contents of the an authentication (e.g., IKE_AUTH) exchange;
2. Filtering based on geo-IP or similar information;
3. IPS type of functionality that is dependent on up-to-date signatures; and
4. IPS type of functionality that involves ML or AI.

Accordingly, novel features of techniques herein as compared to classic security methods may allow a simple device or service on/in a network (which could be part of the VPN gateway itself, separate from the VPN gateway, within authenticator(s), etc.), to identify or distinguish known good authentication (e.g., IKEv2) traffic of a given authentication type and allow such traffic while denying and/or alerting on all other authentication (e.g., IKEv2) traffic for the authentication type.

In some instances, the size/length of known good traffic/packets for an authentication type may be easily determined utilizing automated tooling that could be configured to capture a known good authentication handshake (e.g., IKE handshake) and then generate firewall/authentication rules or signatures that could be utilized for matching/identifying/distinguishing known good exchange or packet types for the authentication type (e.g., IKE_SA_INIT and IKE_AUTH packets for IKEv2). Additional static and/or fixed sized attributes that are communicated in an authentication exchange (e.g., IKE_SA_INIT exchange) could also be used to identify/distinguish a known good message/packet. In some embodiments, such authentication rules or signatures could also be used to monitor a client device that is automatically updated.

In various embodiments, generated firewall/authentication rules or signatures could be published or otherwise passed to one or more network entities such as any combination of firewall/IPS 150, VPN gateway 140, authenticator(s) 124, and/or Linux host(s) 160 depending on implementation. In at least one embodiment, these authentication rules or signatures may be stored in a central key/value store or database (DB), such as K/V DB 130. In one instance, a message bus may be utilized to publish new authentication rule/signature entries within the K/V DB 130 for a particular authentication type to individual entries stored on the various network entities that may be inspecting authentication traffic in order to facilitate subsequent authentications based on the new authentication rules/signatures. In some implementations, a key identifier may be configured for KN DB 130 for each of a given authentication type and/or entity, system, etc. that may utilize the rules/signatures. For a given key identifier of a given authentication type, one or more values, which may be authentication rules/signatures, may be stored in relation to the key identifier such that the authentication rules/signatures for the authentication type can be pushed/pulled to one or more network entities, systems, and/or the like for performing operations as described herein.

Consider an IKEv2 authentication example involving client device 112 and a third-party or otherwise malicious device 116 in which at least one authentication rule/signature is generated and passed to inspection logic 152 of firewall/IPS 150 that identifies a known good size of IKEv2 authentication content for IKEv2 packets that may traverse VPN 120. In one instance, consider that an authentication packet 114 sent from client device 112 is received at firewall/IPS 150. Firewall/IPS 150 via inspection logic 152 may analyze a size of the authentication content of packet 114 in comparison to the signature and, based on a determination that the size of the authentication content of the packet 114 matches the known good size, may permit the packet, as shown in FIG. 1A, such that the packet 114 is forwarded toward an IKEv2 authenticator (124) via VPN gateway 140.

In another instance, consider that a malicious authentication packet 118 sent from malicious device 116 is received at firewall/IPS 150. In this instance, firewall/IPS 150 via inspection logic 152 may analyze a size of the authentication content of packet 118 in comparison to the signature and, based on a determination that the size of the authentication content of the packet 118 does not match the known good size, may drop or otherwise alert on the packet 118.

In some instances, the size of known good traffic can be amended or varied based on one or more authentication options that may be utilized for a given authentication type. Embodiments herein provide for the ability to identify and amend known good criteria for matching packets based on one or more authentication options that may be utilized for a given authentication type.

Consider, for example, that Cookie Notification is one option or feature for IKEv2 that can amend the size of an IKE_SA_INIT exchange. For example, if Cookie Notifications were enabled for a VPN gateway (or other network entity), the size of a legitimate/good IKE_SA_INIT message could be one of two values:

1. The known good size without a Cookie Notification
2. The known good size plus the addition of a Cookie Notification As a Cookie Notification is sent in the clear, an IKE_SA_INIT message could be examined for the presence of a Cookie Notification and as such the logic of a corresponding authentication rule or signature may be as follows:

If IKE header contains Cookie Notification & Header Size=X

Or

If IKE header ! contains Cookie Notification & Header Size=Y

Where X=Known header size for legitimate IKE_SA_INIT message including Cookie Notification.

Where Y=Known header size for legitimate IKE_SA_INIT not including Cookie Notification.

Similar to Cookie Notifications, IKEv2 REDIRECT, as provided in IETF RFC 5685 (https://tools.ietf.org/html/rfc5685) optionally adds a REDIRECTED FROM payload to an IKE_SA_INIT or IKE_AUTH exchange. This payload has a fixed known size. For instances in which a REDIRECT may be enabled on a VPN gateway (or other network entity), the size of a legitimate/good IKE_SA_INIT message or a legitimate/good IKE_AUTH message (depending if the REDIRECT is sent in an IKE_SA_INIT or an IKE_AUTH exchange) could be one of two values:

1. The known size without a REDIRECTED FROM payload
2. The known size, plus the addition of a REDIRECTED FROM payload Consider various IKEv2 examples regarding authentication rule or signature generation. To illustrate features associated with authentication rule or signature generation, consider the following output of IKE_SA_INIT and IKE_AUTH messages, discussed below, as may be obtained or otherwise captured from a client (e.g., client device 112) connecting to a VPN gateway (e.g., VPN gateway 140) in which corresponding authentication rules/signatures (e.g., SNORT® signatures [SNORT® is a registered trademark of Cisco Technology, Inc.] or any other rules/signatures) based on known good criteria may be generated to match or distinguish known good traffic and drop/alert on anything that does not match the known good criteria (e.g., size, etc.).

First, consider an example IKE_SA_INIT packet/message 170, as shown in FIG. 1B. For the example IKE_SA_INIT message 170, certain information/fields have been removed in order to highlight features of the message that may be utilized through techniques presented herein. Example IKE_SA_INIT message 170 includes an IP header 171, a UDP header 172, and authentication content 173 including an authentication header 174 and authentication data 175. For the embodiment of FIG. 1B, authentication header 174 is an IKEv2 header and authentication data 175 is IKEv2 data such that authentication content 173 includes an IKEv2 header+IKEv2 data.

For the example IKE_SA_INIT message shown in FIG. 1B, the size/length includes the size of the IKEv2 header and data, which can be seen as Total Length: 232. If this was legitimate client traffic generation of an authentication rule/signature could be triggered (via authentication rule generator 128) in order to match future IKE_SA_INIT traffic matching this size and drop/alert on IKE_SA_INIT traffic not matching this size.

Differentiating the packet type for IKE_SA_INIT messages from any other IKEv2 traffic can be achieved by inspecting the IKEv2 header (which is sent in the clear) and examining the Exchange Type value in the header, as shown in FIG. 1B. Note that additional attributes in the IKE_SA_INIT exchange, such as the size of the nonce or the vendor ID could have been have additionally been used to create a rule/signature for IKE_SA_INIT messages.

Shown below is an example authentication rule/signature that could be used to permit legitimate IKE_SA_INIT traffic by identifying authentication content sizes that match the known good size:

pass udp any any-→any 500 (dsize:232; msg: "Allowing valid IKE_SA_INIT on port 500 Size==232"; content: "|22|"; offset:18;depth:1; sid:1000001;)

IKE_SA_INIT traffic is typically be sent to port 500. The authentication content 173, which is the whole of the IKEv2 header 174 and data 175, can be seen as being 232 bytes. The rule examines the Exchange Type, which is the 19th byte in the IKE header (174). The 'IKE_SA_INIT' Exchange Type is hexadecimal (hex) 0x22, which is 34 in decimal. Thus, the above rule provides for permitting/allowing an IKE_SA_INIT packet having authentication content equal to a size of 232 bytes, which the authentication rule generator 128 has determined is a valid 'IKE_SA_INIT' packet from a valid client. In one example, identifying traffic from a valid client could include initiating a local connection by a known good client, capturing packet content, and determining the valid length and/or any other authentication content parameters, as discussed herein. Once a new rule/signature is generated, it can be stored in the K/V DB or store 130 and then pushed/pulled to the various enforcement points and used to configure local rules for allowing good authentication packets.

Another example is shown below in which two other rules/signatures could be used to drop/alert on non-legitimate IKE_SA_INIT traffic by identifying authentication content sizes that do not match the known good size:

drop udp any any-→any 500 (dsize:0< >231; msg: "Found IKE_SA_INIT on port 500 Size<232"; content: "|22|"; offset:18;depth:1; sid:1000001;)

drop udp any any-→any 500 (dsize:233< >65535; msg: "Found IKE_SA_INIT on port 500 Size>232"; content: "|22|"; offset:18;depth:1; sid:1000002;)

As inspection logic or the like of a network entity (e.g., inspection logic 152 of firewall/IPS 150) can be utilized to permit/deny traffic, any combination of authentication rules/signatures can be utilized to permit traffic matching the known good size of 232 bytes or not matching the known good size through one rule providing for denying traffic of a size less than 232 bytes and another for denying traffic larger than 232 bytes.

Consider another example involving an example IKE_AUTH message, as shown below in TABLES 1A-1D in which the message is fragmented at the IKE layer into four fragments. For this example, three of the four fragments have a fixed size IKE message size of 532 bytes and the last fragment IKE header has a size of 324 bytes. Such fragmentation is common in IKEv2 clients where the fragmentation size may be hard set within the IKEv2 daemon or may be user configurable. TABLE 1A, below, illustrates features associated with the first fragment of the four fragments for the example IKE_AUTH message.

TABLE 1A

EXAMPLE IKE AUTH MESSAGE (FRAGMENT 1 of 4)

Frame 3: 564 bytes on wire (4512 bits)
Internet Protocol Version 4
   0100 . . . . = Version: 4
   . . . . 0101 = Header Length: 20 bytes (5)
<removed>
User Datagram Protocol, Src Port: ipsec-nat-t (4500), Dst Port: ipsec-nat-t (4500)
   Source Port: ipsec-nat-t (4500)
   Destination Port: ipsec-nat-t (4500)
<removed>
UDP Encapsulation of IPsec Packets
   Non-ESP Marker
Internet Security Association and Key Management Protocol
   Initiator SPI: e5226549ela525e2
   Responder SPI: 81a3fle2e76e9736
   Next payload: Encrypted and Authenticated Fragment (53)
   Version: 2.0
     0010 . . . . = MjVer: 0x2
     . . . . 0000 = MnVer: 0x0
   Exchange type: IKE_AUTH (35)
   Flags: 0x08 (Initiator, No higher version,
     . . . . 1. . . = Initiator: Initiator
     . . . 0 . . . .= Version: No higher version
     . . 0 . . . . .= Response: Request
   Message ID: 0x00000001
   Length: 532
   <removed>
     Payload length: 504
     Fragment Number: 1
     Total Fragments: 4
<removed>

Differentiating the packet type for IKE_AUTH messages from any other IKEv2 traffic can be achieved by inspecting the IKEv2 header (which is sent in the clear) and examining the Exchange Type field for a packet.

As shown above in TABLE 1A, the IKE_AUTH header Exchange Type value has decimal value 35, hex 0x23. An authentication rule can be utilized to inspect the hex value in the 23rd byte of the IKE header. The difference between the Exchange Type being in the 19th octet for an IKE_SA_INIT message and the 23rd octet for IKE_AUTH messages is due to UDP encapsulation being used. UDP encapsulation involves a 4-byte non-Encapsulating Security Payload (non-ESP) marker. The presence of this UDP encapsulation can also used as an identifier in an authentication rule/signature, as shown below.

Upon a determination that the IKE_AUTH message as shown in TABLE 1A represents legitimate client traffic, a rule could be generated to match IKE_AUTH traffic of anything but the known good size and drop/alert on any such traffic.

Shown below is an example authentication rule/signature that may be used to permit legitimate IKE_AUTH traffic by identifying authentication content sizes that match the known good size:

pass udp any any-→any 4500 (dsize:536; msg:"Allowing valid IKE_AUTH on port 4500 Size=536"; sid: 1000003; content:"|23|"; offset:22; depth:1; content: "|00 01|"; offset:36; depth:2;)

IKE_AUTH traffic is typically sent on UDP port 4500. Thus, the above rule/signature provides for the ability to examine the Exchange Type, which is the 23rd byte in the IKE header (offset:22). The IKE_AUTH Exchange Type is hex 0x23, which is 35 in decimal. The authentication content, which may be considered the whole of the IKEv2 header and data, can be seen as being 532 bytes. The rule can be configured to match on an application protocol size of 536 and not 532 in which the additional four bytes are due to the addition of a UDP encapsulation header. Thus, the above rule is set to match on this size plus 4 bytes for the UDP encapsulation for a total of 536 bytes. The Fragment Number is the 37th byte in the header (offset:36) which is used to match fragment 1 (00 01). Accordingly, the above rule provides for permitting/allowing an IKE_AUTH packet having authentication content of size 536 bytes.

Another example is shown in which two other rules could be used to drop/alert on non-legitimate IKE_AUTH traffic based on the known good IKE_AUTH traffic illustrated in TABLE 1A for Fragment Number matching fragment number 1 (00 01) by identifying authentication content sizes that do not match the known good size of 536 bytes:

drop udp any any-→any 4500 (dsize:0< >535; msg: "Found IKE_AUTH Fragment 1 on port 4500 Size<536"; sid:1000003; content:"|23|"; offset:22; depth:1; content:"|00 01|"; offset:36; depth:2;)

drop udp any any-→any 4500 (dsize:537< >65535; msg: "Found IKE_AUTH Fragment 1 on port 4500 Size>536"; sid:1000004; content:"|23|"; offset:22; depth:1; content:"|00 01|";offset:36;depth:2;)

As inspection logic or the like of a network entity (e.g., inspection logic 152 of firewall/IPS 150) can be utilized to permit/deny traffic, any combination of authentication rules/signatures can be utilized to permit traffic matching the known good size of 536 bytes or not matching the known good size through one rule providing for denying traffic of a size less than 536 bytes and another for denying traffic larger than 536 bytes.

TABLE 1B, below, illustrates features associated with the second fragment of the four fragments for the example IKE_AUTH message.

TABLE 1B

EXAMPLE IKE AUTH MESSAGE (FRAGMENT 2 of 4)

Frame 4: 564 bytes on wire (4512 bits)
Internet Protocol Version 4
   0100 . . . . = Version: 4
   . . . . 0101 = Header Length: 20 bytes (5)
   Differentiated Services Field: 0x00 (DSCP: CS0, ECN: Not-ECT)
     0000 00 . . = Differentiated Services Codepoint: Default (0)
     . . . . . . 00 = Explicit Congestion Notification: Not ECN-Capable Transport (0)
   Total Length: 564
<removed>
User Datagram Protocol, Src Port: ipsec-nat-t (4500), Dst Port: ipsec-nat-t (4500)
   Source Port: ipsec-nat-t (4500)
   Destination Port: ipsec-nat-t (4500)
   Length: 544
   <removed>
UDP Encapsulation of IPsec Packets
   Non-ESP Marker
Internet Security Association and Key Management Protocol
   Initiator SPI: e5226549ela525e2
   Responder SPI: 81a3fle2e76e9736
   Next payload: Encrypted and Authenticated Fragment (53)
   Version: 2.0
     0010 . . . . = MjVer: 0x2
     . . . . 0000 = MnVer: 0x0
   Exchange type: IKE_AUTH (35)
   Flags: 0x08 (Initiator, No higher version, Request)
     . . . . 1 . . . = Initiator: Initiator
     . . . 0 . . . . = Version: No higher version
     . . 0 . . . . . . = Response: Request
   Message ID: 0x00000001
   Length: 532

TABLE 1B-continued

EXAMPLE IKE AUTH MESSAGE (FRAGMENT 2 of 4)

<removed>
    Payload length: 504
    Fragment Number: 2
    Total Fragments: 4
<removed>

Similar to the authentication rule/signature above, shown below are example authentication rules/signatures that could be used to permit legitimate IKE_AUTH traffic and/or drop/alert on non-legitimate IKE_AUTH traffic based on the known good IKE_AUTH traffic illustrated in TABLE 1B for Fragment Number matching fragment number 2 (00 02):

pass udp any any-→any 4500 (dsize:536; msg:"Allowing valid IKE_AUTH on port 4500 Size=536"; sid: 1000003; content:"|23|"; offset:22; depth:1; content: "|00 02|"; offset:36; depth:2;)

drop udp any any-→any 4500 (dsize:0< >535; msg: "Found IKE_AUTH Fragment 2 on port 4500 Size<536"; sid:1000005; content:"|23|"; offset:22; depth:1; content:"|00 02|"; offset:36; depth:2;)

drop udp any any-→any 4500 (dsize:537< >65535; msg: "Found IKE_AUTH Fragment 2 on port 4500 Size>536"; sid:1000006; content:"|23|"; offset:22; depth:1; content:"|00 02|";offset:36;depth:2;)

TABLE 1C, below, illustrates features associated with the third fragment of the four fragments for the example IKE_AUTH message.

TABLE 1C

EXAMPLE IKE AUTH MESSAGE (FRAGMENT 3 of 4)

Frame 5: 564 bytes on wire (4512 bits)
Internet Protocol Version 4
    0100 . . . . = Version: 4
    . . . . 0101 = Header Length: 20 bytes (5)
    Differentiated Services Field: 0x00 (DSCP: CS0, ECN: Not-ECT)
        0000 00. . = Differentiated Services Codepoint: Default ( 0)
        . . . . . . 00 = Explicit Congestion Notification: Not ECN-Capable Transport (0)
    Total Length: 564
    <removed>
User Datagram Protocol, Src Port: ipsec-nat-t (4500), Dst Port: ipsec-nat-t (4500)
    Source Port: ipsec-nat-t (4500)
    Destination Port: ipsec-nat-t (4500)
    Length: 544
    <removed>
UDP Encapsulation of IPsec Packets
    Non-ESP Marker
Internet Security Association and Key Management Protocol
    Initiator SPI: e5226549ela525e2
    Responder SPI: 81a3fle2e76e9736
    Next payload: Encrypted and Authenticated Fragment (53)
    Version: 2.0
        0010 . . . . = MjVer: 0x2
        . . . . 0000 = MnVer: 0x0
    Exchange type: IKE_AUTH (35)
    Flags: 0x08 (Initiator, No higher version, Request)
        . . . . 1 . . . = Initiator: Initiator
        . . . 0 . . . . = Version: No higher version
        . . 0 . . . . . = Response: Request
    Message ID: 0x00000001
    Length: 532
    <removed>
        Payload length: 504
        Fragment Number: 3
        Total Fragments: 4
<removed>

Similar to the authentication rules/signatures above, shown below are example authentication rules/signatures that could be used to permit/allow legitimate IKE_AUTH traffic and/or drop/alert on non-legitimate IKE_AUTH traffic based on the known good IKE_AUTH traffic illustrated in TABLE 1C for Fragment Number matching fragment number 3 (00 03):

pass udp any any-→any 4500 (dsize:536; msg:"Allowing valid IKE_AUTH on port 4500 Size=536"; sid: 1000003; content:"|23|"; offset:22; depth:1; content: "|00 03|"; offset:36; depth:2;)

drop udp any any-→any 4500 (dsize:0< >535; msg: "Found IKE_AUTH Fragment 3 on port 4500 Size<536"; sid:1000007; content:"|23|"; offset:22; depth:1; content:"|00 03|"; offset:36; depth:2;)

drop udp any any-→any 4500 (dsize:537< >65535; msg: "Found IKE_AUTH Fragment 3 on port 4500 Size>536"; sid:1000008; content:"|23|"; offset:22; depth:1; content:"|00 03|";offset:36;depth:2;)

TABLE 1D, below, illustrates features associated with the fourth fragment of the four fragments for the example IKE_AUTH message.

TABLE 1D

EXAMPLE IKE AUTH MESSAGE (FRAGMENT 4 of 4)

Frame 6: 356 bytes on wire (2848 bits)
Internet Protocol Version 4
    0100 . . . . = Version: 4
    . . . . 0101 =Header Length: 20 bytes (5)
    Differentiated Services Field: 0x00 (DSCP: CS0, ECN: Not-ECT)
        0000 00. . = Differentiated Services Codepoint: Default ( 0)
        . . . . . . 00 = Explicit Congestion Notification: Not ECN-Capable Transport (0)
    Total Length: 356
    <removed>
User Datagram Protocol, Src Port: ipsec-nat-t (4500), Dst Port: ipsec-nat-t (4500)
    Source Port: ipsec-nat-t (4500)
    Destination Port: ipsec-nat-t (4500)
    Length: 336
    <removed>
UDP Encapsulation of IPsec Packets
    Non-ESP Marker
Internet Security Association and Key Management Protocol
    Initiator SPI: e5226549ela525e2
    Responder SPI: 81a3fle2e76e9736
    Next payload: Encrypted and Authenticated Fragment (53)
    Version: 2.0
        0010 . . . . = MjVer: 0x2
        . . . . 0000 = MnVer: 0x0
    Exchange type: IKE_AUTH (35)
    Flags: 0x08 (Initiator, No higher version,
        . . . . 1 . . . = Initiator: Initiator
        . . . 0 . . . . = Version: No higher version
        . . 0 . . . . . = Response: Request
    Message ID: 0x00000001
    Length: 324
    <removed>
        Payload length: 296
        Fragment Number: 4
        Total Fragments: 4

Similar to the authentication rules/signatures above, shown below are example authentication rules/signatures that could be used to permit/allow legitimate IKE_AUTH traffic and/or drop/alert on non-legitimate IKE_AUTH traffic based on the known good IKE_AUTH traffic illustrated in TABLE 1C for Fragment Number matching fragment number 4 (00 04), however, the size is 328 (IKE message length plus 4 bytes for the UDP encapsulation):

pass udp any any-→any 4500 (dsize:328; msg:"Allowing valid IKE_AUTH on port 4500 Size=328"; sid:

1000003; content:"|23|"; offset:22; depth:1; content: "|00 04|"; offset:36; depth:2;)

drop udp any any-→any 4500 (dsize:0< >327; msg: "Found IKE_AUTH Fragment 4 on port 4500 Size<328"; sid:1000009; content:"|23|"; offset:22; depth:1; content:"|00 04|"; offset:36; depth:2;)

drop udp any any-→any 4500 (dsize:329< >65535; msg: "Found IKE_AUTH Fragment 4 on port 4500 Size>328"; sid:1000010; content:"|23|"; offset:22; depth:1; content:"|00 04|";offset:36;depth:2;)

In some instances, IKEv2 fragmentation (https://tools.ietforg/html/rfc7383) provides a method to fragment IKE traffic at the IKE application layer. If this is enabled, IKE_AUTH traffic will typically be sent in a number of fragments in which the initial fragments may be of a set size and the last fragment may be of a different size to the initial fragments. This is visible in the IKE_AUTH messages above, where the frames are numbered 1 to 3 and of the same size and the final fragment is of a different size.

Potentially, techniques described herein may involve considerations if fragmentation occurs at the IP level rather than using IKEv2 fragmentation. For instances in which IP level fragmentation may occur, the known size of IP traffic can change and, as such, modifications of authentication rules may be involved. However, for a common IKEv2 client where the cryptographic ciphers are preconfigured (thus reducing the number of ciphers negotiated) the IKE_SA_INIT message is usually under 1000 bytes and as such is rarely fragmented at the IP layer. IKEv2 fragmentation provides the ability for IKE_AUTH traffic to be fragmented. Thus, it may be assumed that the value used for IKEv2 fragmentation may be lower than any Maximum Transmission Unit (MTU) between VPN peers and as such IKE_AUTH traffic may not be subject to IP fragmentation. Techniques herein may provide an ideal enterprise solution for implementations in which IKEv2 clients are static in nature (e.g., having a same operating system and IKEv2 client software).

Accordingly, techniques herein provide for the ability to take a snapshot of legitimate authentication traffic (e.g., IKE_SA_INIT and IKE_AUTH IKEv2 traffic), note the size of the authentication content of this traffic and potentially other additional attributes in the authentication exchange. One or more filtering or authentication rules/signatures can be created to permit or deny any authentication traffic that does not conform to the known good attributes or parameters in addition to the known good size (collectively, known good criteria). Additionally, techniques herein provide for the ability to augment known good criteria, such as authentication content size based on different options that may be utilized by a given authentication type (e.g., redirect, cookie notification, etc.), which can increase the size and/or trigger the generation of additional rules for such sizes.

Although the examples discussed herein are provided with reference to IKEv2, it is to be understood that other variations can be envisioned for other packet/message types and authentication types (e.g., SSL (TLS or DTLS), IKEv1, WireGuard®, etc.) that may be utilized in accordance with techniques described herein.

For example, for the IKEv1 authentication type, as prescribed at least by RFC 2409 and 4109, other authentication rule(s)/signature(s) could be generated based on the authentication phase and/or mode (main, aggressive, or quick) and the authentication messages exchanged during authentication. For WireGuard®, initial packets are all the same size. Thus, authentication rule(s)/signature(s) to distinguish good packets may be generated to parse a public key contained in packets in order to allow, for example, valid WireGuard® first packets that contain an a priori known valid public key.

In another example, consider various authentication rules/signatures that may be generated for SSL authentication including TLS authentication and DTLS authentication. To identify good packets of the SSL variety, authentication rules/signatures could be generated to key on authentication content contained in a ClientHello message. The general format/features of a ClientHello message are prescribed by RFC 5246. During authentication using TLS/DTLS, after an initial Transport Control Protocol (TCP) or UDP connection is established, a ClientHello message is sent out. In accordance with embodiments herein, whitelist operations can be performed based on authentication content of ClientHello messages in order to allow good TLS/DTLS authentication traffic while dropping/alerting on bad TLS/DTLS authentication content. It should be noted that initial ClientHello packets are unencrypted. In one embodiment, any combination of one or more authentication content parameters, such as the Server Name (SNI) value of a ClientHello message, types of encryption supported (e.g., the CipherSuite, as shown below), etc. can be provided in an authentication rule/signature that can be utilized for such whitelisting comparison operations. Consider example details that may be associated with an example valid ClientHello message for SSL TLS, as shown in TABLE 2, below.

TABLE 2

EXAMPLE SSL TLS ClientHello MESSAGE

```
const unsigned char good_data_1[ ] = {
 // TLS record
 0x16, // Content Type: Handshake
 0x03, 0x01, // Version: TLS 1.0
 0x00, 0x68, // Length
   // Handshake
   0x01, // Handshake Type: Client Hello
   0x00, 0x00, 0x64, // Length
   0x03, 0x01, // Version: TLS 1.0
   // Random
   0x4e, 0x55, 0xde, 0x32, 0x80, 0x07, 0x92, 0x9f,
   0x50, 0x41, 0xe4, 0xf9, 0x58, 0x32, 0xfc, 0x4f,
   0x10, 0xb3, 0xde, 0x44, 0x4d, 0xa9, 0x67, 0x78,
   0xea, 0xd1, 0x5f, 0x29, 0x09, 0x04, 0xc1, 0x06,
   0x00, // Session ID Length
   0x00, 0x28, // Cipher Suites Length
     0x00, 0x39,
     0x00, 0x38,
     0x00, 0x35,
     0x00, 0x16,
     0x00, 0x13,
     0x00, 0x0a,
     0x00, 0x33,
     0x00, 0x32,
     0x00, 0x2f,
     0x00, 0x05,
     0x00, 0x04,
     0x00, 0x15,
     0x00, 0x12,
     0x00, 0x09,
     0x00, 0x14,
     0x00, 0x11,
     0x00, 0x08,
     0x00, 0x06,
     0x00, 0x03,
     0x00, 0xff,
   0x02, // Compression Methods
     0x01,
     0x00,
   0x00, 0x12, // Extensions Length
     0x00, 0x00, // Extension Type: Server Name
     0x00, 0x0e, // Length
     0x00, 0x0c, // Server Name Indication Length
       0x00, // Server Name Type: host_name
```

TABLE 2-continued

EXAMPLE SSL TLS ClientHello MESSAGE

```
    0x00, 0x09, // Length
    // "localhost"
    0x6c, 0x6f, 0x63, 0x61, 0x6c, 0x68, 0x6f, 0x73, 0x74
};
```

For a client ClientHello packet type of the SSL TLS authentication type, authentication rule(s)/signature(s) could be generated based on the valid ClientHello message shown in TABLE 2 that allows valid/legitimate ClientHello messages having packet length equal to hex 0x68 for one or more specific SNI value(s) that may vary based on the Domain Name System (DNS) entries for services, etc. to which one or more client devices may try to connect.

Consider another example involving an example valid ClientHello message for SSL DTLS, as shown in TABLE 3, below.

TABLE 3

EXAMPLE SSL DTLS ClientHello MESSAGE

```
const unsigned char good_data_1[ ] = {
    // UDP payload length
    0x00, 0xdd,
    // DTLS Record Layer
    0x16, // Content Type: Handshake
    0xfe, 0xfd, // Version: DTLS 1.2
    0x00, 0x00, // Epoch
    0x00, 0x00, 0x00, 0x00, 0x00, 0x00, // Sequence Number
    0x00, 0xc8, // Length
        // Handshake
        0x01, // Handshake Type: Client Hello
        0x00, 0x00, 0xbc, // Length
        0x00, 0x00, // Message sequence
        0x00, 0x00, 0x00, // Fragment offset
        0x00, 0x00, 0xbc, // Fragment length
        0xfe, 0xfd, // Version: DTLS 1.2
        0x4a, 0x72, 0xfb, 0x78, // Unix Time
        0xbc, 0x96, // Random
            0x1e, 0xf3, 0x78, 0x01, 0xa3, 0xa8,
            0xcf, 0x84, 0x14, 0xe5, 0xec, 0x06,
            0xee, 0xdb, 0x09, 0xde, 0x27, 0x62,
            0x3c, 0xd2, 0xb8, 0x00, 0x5f, 0x14,
            0x8c, 0xfc,
        0x20, // Session ID Length
            0x51, 0x1b, 0xb8, 0xf9, 0x10, 0x79, // Session ID
            0x23, 0x2c, 0xbb, 0x88, 0x92, 0x7c,
            0xb8, 0x51, 0x70, 0x8e, 0x50, 0x02,
            0x25, 0xd9, 0x85, 0xf3, 0x49, 0xe3,
            0xdb, 0x63, 0xf7, 0x4a, 0x06, 0xcb,
            0x6a, 0x0e,
        0x00, // Cookie Length
        0x00, 0x02, // Cipher suite length
        0xc0, 0x2c, // Cipher suite
        0x01, // Compression method length
        0x00, // Compression method
        0x00, 0x70, // Extension length
            0x00, 0x00, // Sever Name
            0x00, 0x18, // Length
            0x00, 0x16, // Server Name List Length
                0x00, // Server name type: hostname
                0x00, 0x13, // Server name length
                0x6e, 0x67, 0x69, 0x6e, // Server name: nginx1.umbrella.com
                0x78, 0x31, 0x2e, 0x75,
                0x6d, 0x62, 0x72, 0x65,
                0x6c, 0x6c, 0x61, 0x2e,
                0x63, 0x6f, 0x6d,
            0x00, 0x0b, // Type: ec_point formats
            0x00, 0x04, // Length
                0x03, // EC point format length
                0x00, // Uncompressed
                0x01, // ansiX962_compressed_prime
                0x02, // ansiX962_compressed_char2
            0x00, 0x0a, // Type: Supported groups
```

TABLE 3-continued

EXAMPLE SSL DTLS ClientHello MESSAGE

```
            0x00, 0x0c, // Length
            0x00, 0x0a, // Supported groups list length
                0x00, 0x1d, // x25519
                0x00, 0x17, // secp256r1
                0x00, 0x1e, // x448
                0x00, 0x19, // secp521r1
                0x00, 0x18, // secp384r1
            0x00, 0x16, // Type: encrypt_then_mac
            0x00, 0x00, // Length
            0x00, 0x17, // Type: extended_master_secret
            0x00, 0x00, // Length
            0x00, 0x0d, // Type: Signature algorithms
            0x00, 0x30, // Length
            0x00, 0x2e, // Hash Algorithms length
                // ecdsa_secp256r1_sha256
                0x04, // SHA256
                0x03, // EDCSA
                // ecdsa_secp384r1_sha384
                0x05, // SHA384
                0x03, // EDCSA
                // ecdsa_secp521r1_sha512
                0x06, // SHA512
                0x03, // EDCSA
                // ed25519
                0x08, // unknown
                0x07, // unknown
                // ed448
                0x08, // unknown
                0x08, // unknown
                // rsa_pss_pss_sha256
                0x08, // unknown
                0x09, // unknown
                // rsa_pss_pss_sha384
                0x08, // unknown
                0x0a, // unknown
                // rsa_pss_pss_sha512
                0x08, // unknown
                0x0b, // unknown
                // rsa_pss_pss_sha256
                0x08, // unknown
                0x04, // unknown
                // rsa_pss_rsae_sha384
                0x08, // unknown
                0x05, // unknown
                // rsa_pss_rsae_sha512
                0x08, // unknown
                0x06, // unknown
                // rsa_pkcs1_sha256
                0x04, // SHA256
                0x01, // RSA
                // rsa_pkcs1_sha384
                0x05, // SHA384
                0x01, // RSA
                // rsa_pkcs1_sha512
                0x06, // SHA512
                0x01, // RSA
                // SHA224 EDCSA
                0x03, // SHA224
                0x03, // EDCSA
                // edcsa_sha1
                0x02, // SHA1
                0x03, // EDCSA
                // SHA224 RSA
                0x03, // SHA224
                0x01, // RSA
                // rsa_pkcs1_sha1
                0x02, // SHA1
                0x01, // RSA
                // SHA224 DSA
                0x03, // SHA224
                0x02, // DSA
                // SHA1 DSA
                0x02, // SHA1
                0x02, // DSA
                // SHA256 DSA
                0x04, // SHA256
                0x02, // DSA
                // SHA384 DSA
```

TABLE 3-continued

EXAMPLE SSL DTLS ClientHello MESSAGE

0x05, // SHA384
0x02, // DSA
// SHA512 DSA
0x06, // SHA512
0x02 // DSA

For a client ClientHello packet type of the SSL DTLS authentication type, authentication rule(s)/signature(s) could be generated based on the valid ClientHello message shown in TABLE 3 that allows valid/legitimate ClientHello messages having packet length equal to hex 0xc8 for one or more specific SNI value(s) that may vary based on the DNS entries for services, etc. to which one or more client devices may try to connect.

Figure 2:
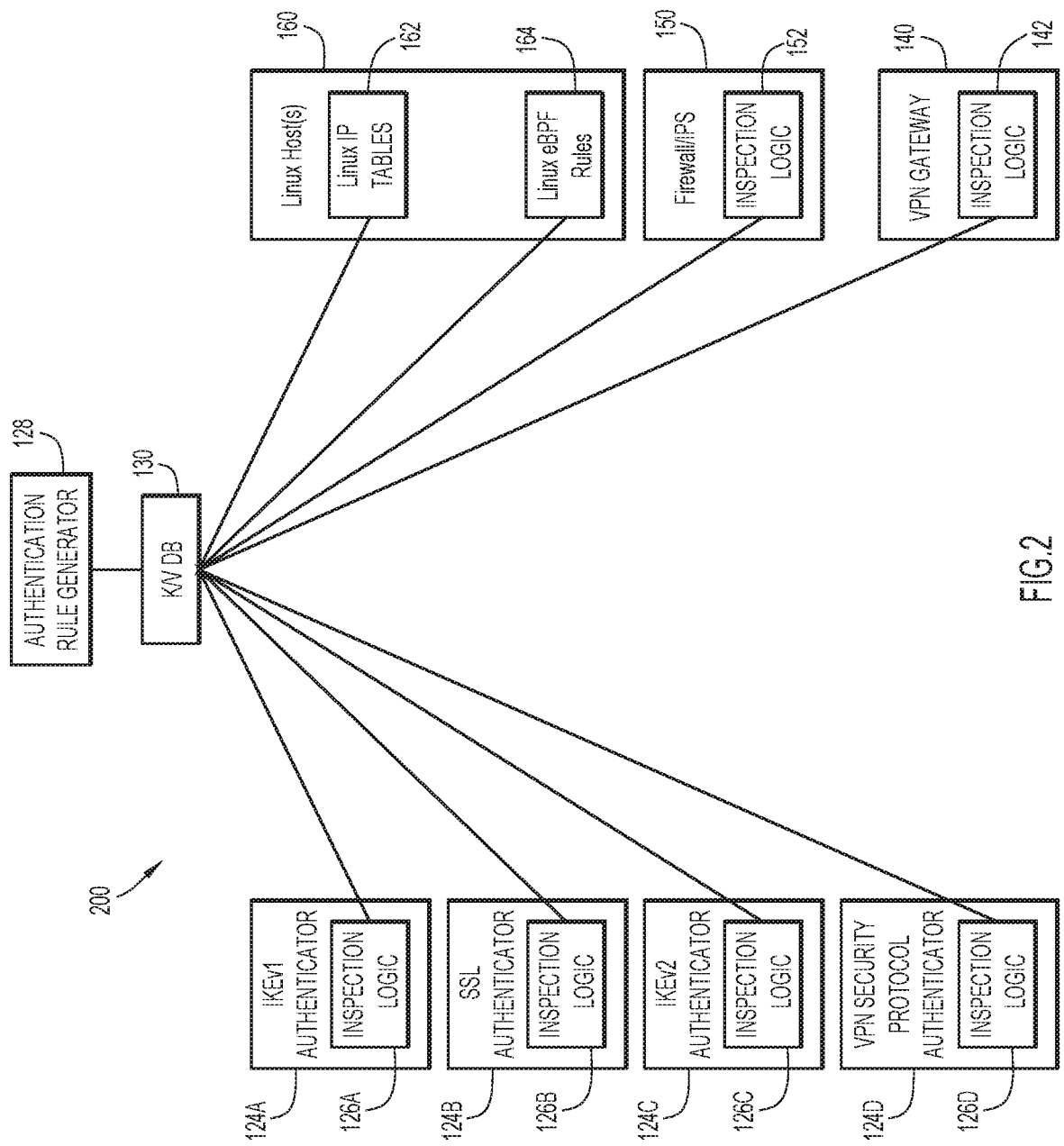
FIG. 2 is a block diagram illustrating example details associated with generating authentication rules for known good traffic for the system of FIG. 1A, according to an example embodiment.

Referring to FIG. 2, FIG. 2 is a block diagram 200 illustrating example details associated with generating authentication rules for known good traffic for the system 100 of FIG. 1A, according to an example embodiment. FIG. 2 includes authentication rule generator 128, K/V DB 130, Linux host(s) 160, firewall/IPS 150, VPN gateway 140 and various authenticators 124 including an IKEv1 authenticator 124a, an SSL authenticator 124b (inclusive of an SSL TLS or SSL DTLS authenticator), an IKEv2 authenticator 124c, and a general VPN security protocol authenticator 124, which may, in at least one embodiment represent a WireGuard® authenticator. In various embodiments, K/V DB 130 may be configured internal or external to authentication rule generator 128.

Each Linux host 160 may include Linux IP tables 162 and/or a Linux extended Berkeley Packet Filter (eBPF) rules 164 that may be collectively utilized for routing/forwarding legitimate traffic or dropping/alerting on non-legitimate traffic. For example, IP tables 162 and/or eBPF rules 164 could be generated in their respective formats to allow specific packets in and drop all other ones. Firewall/IPS 150 can include inspection logic 152 and VPN gateway 140 can include inspection logic 142. Further, IKEv1 authenticator 124a can include inspection logic 126a, SSL authenticator 124b can include inspection logic 126b, IKEv2 authenticator 124c can include inspection logic 126c, and general VPN security protocol authenticator 124d can include inspection logic 126d.

For FIG. 2, the authentication rule generator 128 can process requests and generate relevant authentication rules/signatures for any combination of firewall/IPS devices 150, Linux hosts 160 (both IP tables 162 and eBPF rules 164), and even specific authentication systems, such as any of authenticators 124a-124d. Once generated, the rules/signatures can be published to K/V DB 130 and can be pushed or pulled to the various devices/systems. The good signatures can then be used to allow/permit traffic for known good authentication attempts while dropping/alerting on bad attempts.

Figure 3:
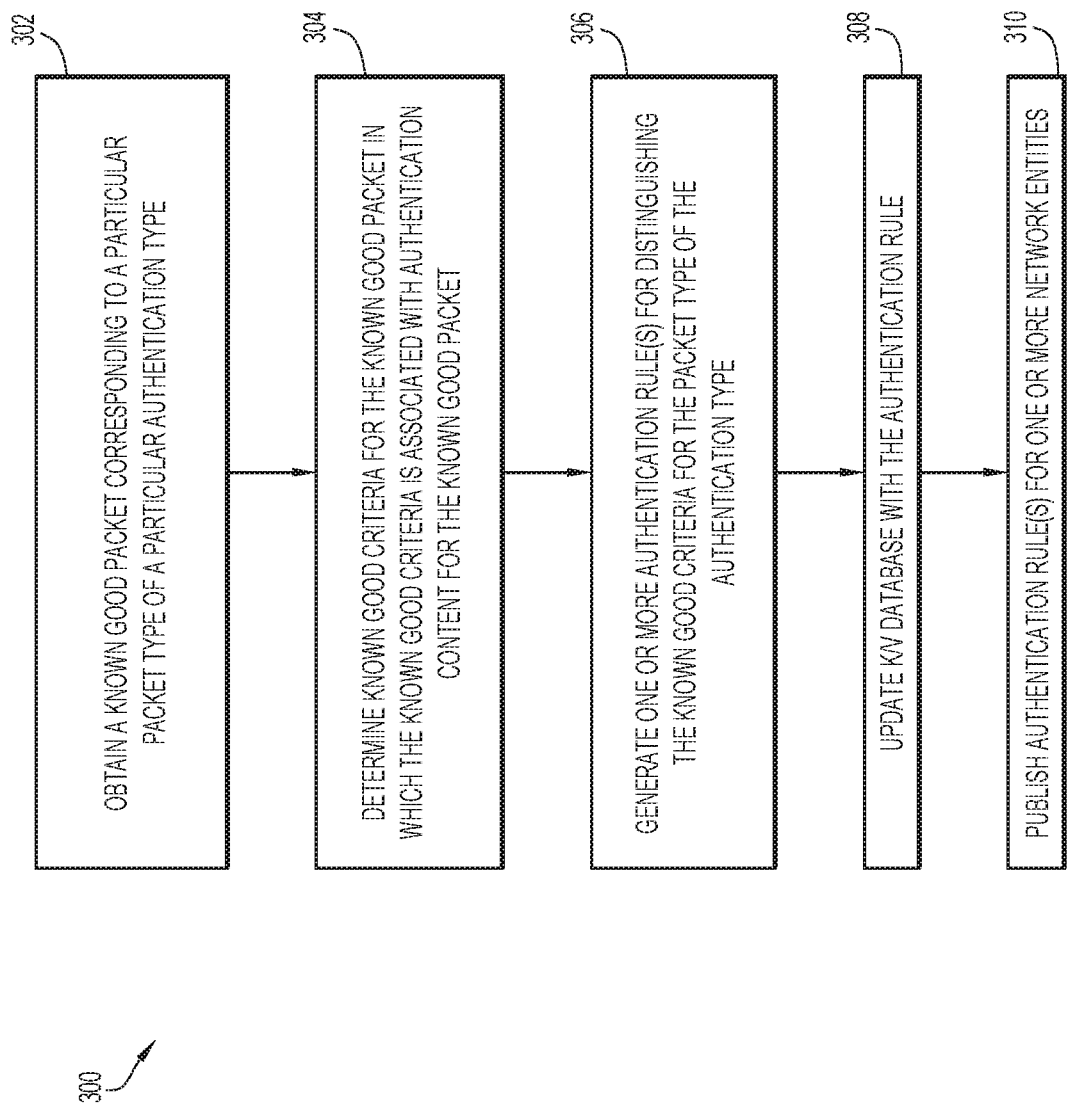
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed, at least in part, via an authentication rule generator, such as authentication rule generator 128 to generate one or more authentication rule(s).

At 302, the method may include obtaining a known good packet corresponding to a particular packet type of a particular authentication type (e.g., an IKE_AUTH or IKE_SA_INIT packet for IKEv2).

At 304, the method may include determining known good criteria for the known good packet in which the known good criteria is associated with authentication content for the known good packet. For example, determining the known good criteria may include determining a known good size for the authentication content. In one embodiment, the known good size may be determined or adjusted based on an encapsulation type for the packet (e.g., adding 4 bytes for UDP), based on determining a particular notification is contained in the authentication content (e.g., a Cookie Notification), based on determining a fragment number for the packet, and/or the like. In some instances, determining the known good criteria can include identifying one or more authentication content parameters for the known good packet such as a known good nonce size, a vendor identifier payload, and/or the like.

At 306, the method may include generating one or more authentication rule(s) or signature(s) for distinguishing the known good criteria for the packet type of the authentication type. In some embodiments, an authentication rule/signature may be a pass rule for matching the size of authentication content of a packet to a known good size of the authentication content of the known good packet. In some embodiments, authentication rules/signatures may be drop rules for determining that the size of authentication content of a packet does not match the known good size of the authentication content of the known packet (e.g., is greater than or less than the known size). Other variations can be envisioned, such as, for example, to match authentication content parameters for packets in combination with any other size-based rules.

At 308, the method may include updating a K/V database (e.g., K/V database 130) with the generated authentication rule(s)/signature(s). At 310, the method may include publishing the authentication rule(s)/signature(s) for one or more network entities. In various embodiments, the publishing can include any combination of push and/or pull operations to provide the authentication rule(s)/signature(s) for one or more network entities.

Figure 4:
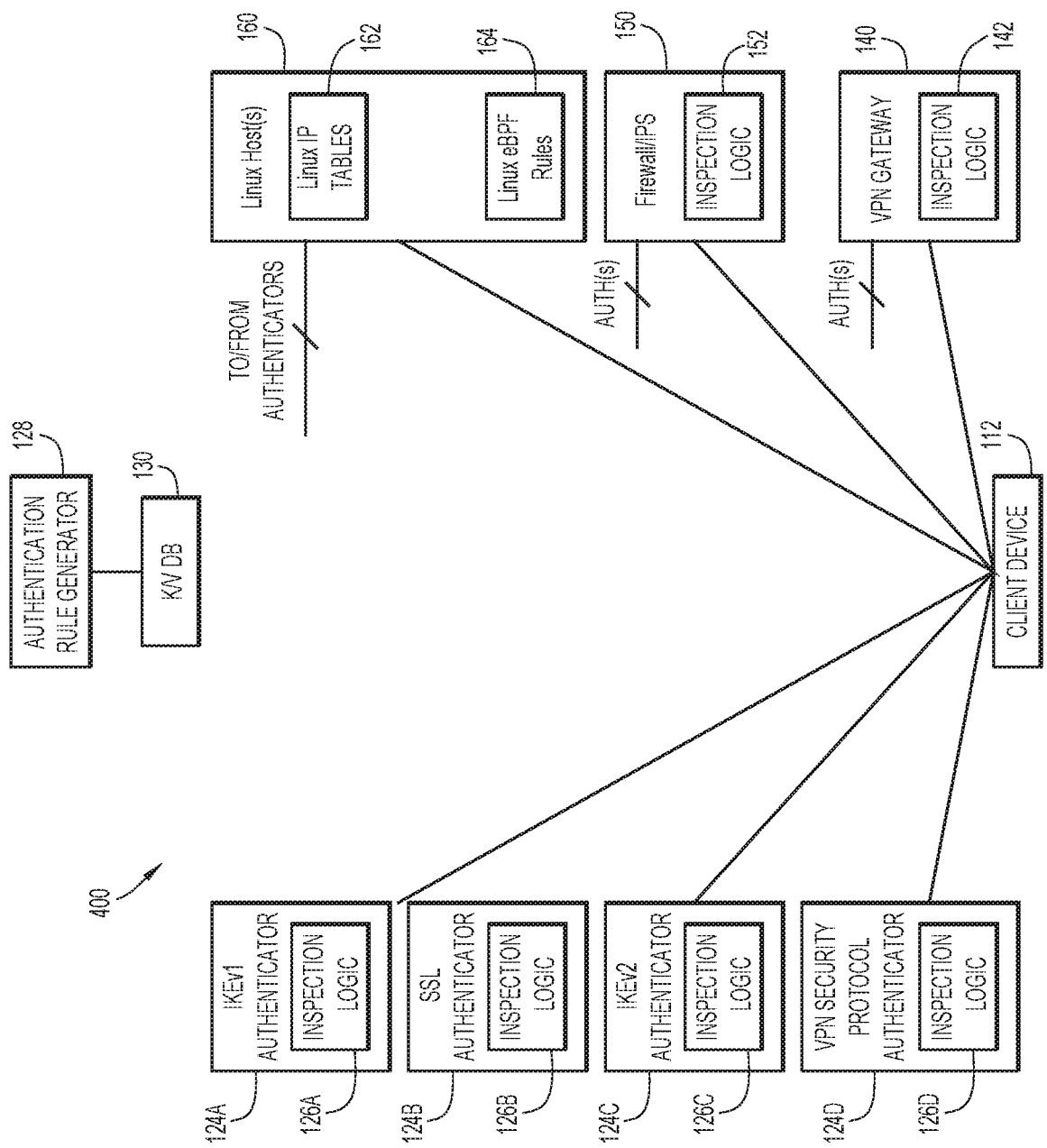
FIG. 4 is a block diagram illustrating example details associated with client connections that may be utilized in the system of FIG. 1A, according to an example embodiment.

Referring to FIG. 4, FIG. 4 is a block diagram 400 illustrating example details associated with client device connections that may be utilized in the system 100 of FIG. 1A, according to an example embodiment. FIG. 4 includes features as shown for FIG. 2 and further illustrates, that upon generation of one or more authentication rule(s)/signature(s), client devices, such as client device 112 can communicate with various VPN devices/network entities (e.g., any of VPN gateway 140, firewall/IPS 150, Linux host(s) 160, and/or authenticator(s) 124a-124d). Any of VPN gateway 140, firewall/IPS 150, and/or Linux host(s) 160 may also communicate with any of authenticator(s) 124a-124d.

Depending on configuration, any combination of VPN network entities may be configured to use the authentication rule(s)/signatures for distinguishing known good traffic in order to permit/allow legitimate/relevant authentication traffic and dropping/alerting on other authentication traffic. As discussed above, multiple mitigations may be possible in some embodiments, as different VPN devices may be configured with different rule(s)/signature(s) to permit/drop/alert authentication traffic based on different known good criteria.

Figure 5:
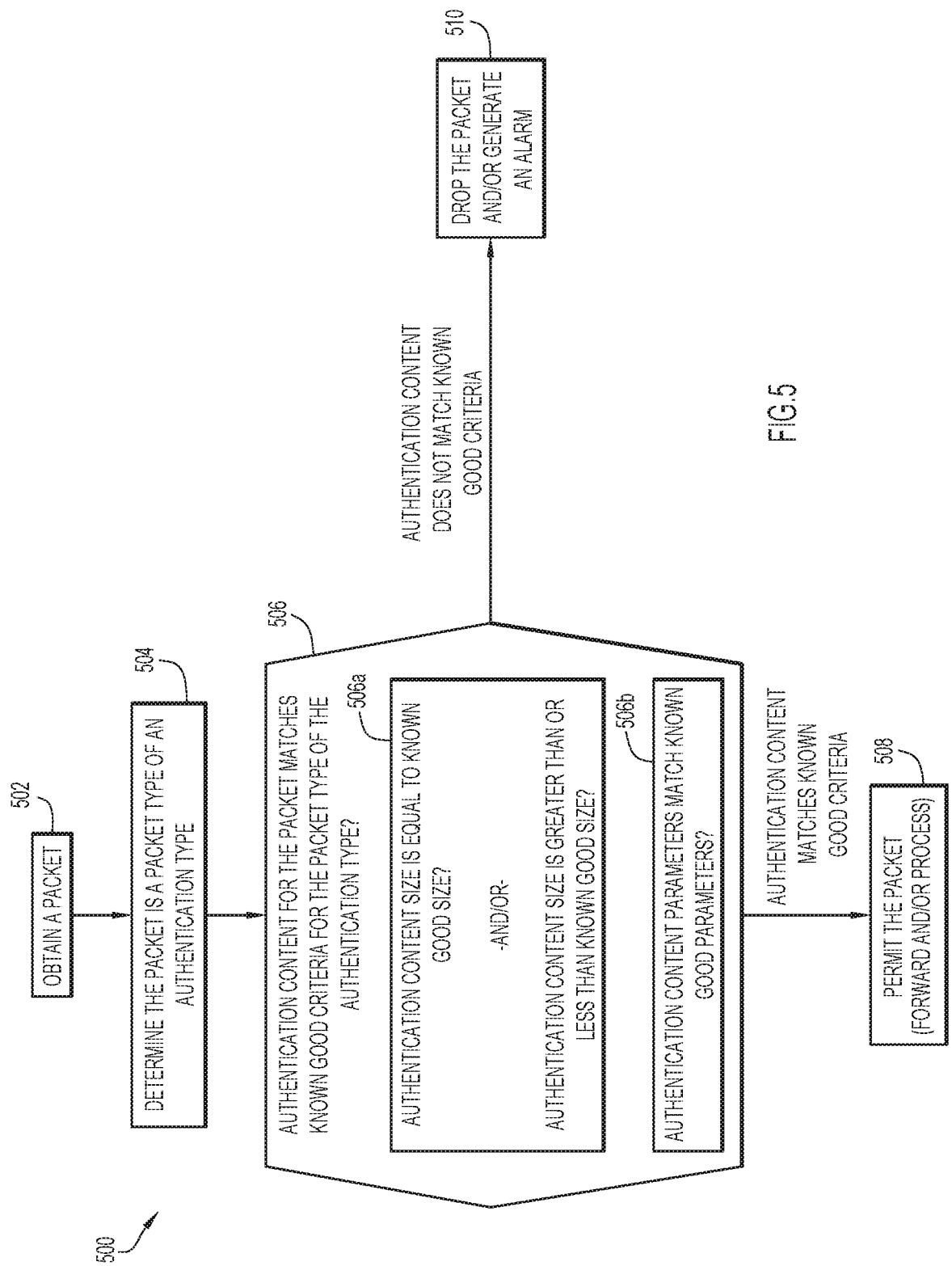
FIG. 5 is another flow chart depicting another method according to an example embodiment.

FIG. 5 is another flow chart depicting another method 500 according to an example embodiment. In at least one embodiment, method 500 illustrates example operations that may be performed by any VPN network entity (e.g., any of any of VPN gateway 140, firewall/IPS 150, Linux host(s) 160, and/or authenticator(s) 124a-124d) that may be configured with any combination of logic, filtering rules, and/or the like in order to permit/drop/alert authentication traffic in accordance with embodiments herein.

At 502, the method may include obtaining a packet by a network entity. At 504, the method may include the network entity determining that the packet is a packet type of an authentication type. For example, in one embodiment, the network entity may identify the packet type as an IKE_AUTH or IKE_SA_INIT packet for IKEv2 based on an Exchange Type identified in an authentication header of the packet. Other information from a packet may be utilized in order to identify a given packet type for a given authentication type. In another example, the network entity may identify the packet type as a ClientHello packet for SSL TLS or SSL DTLS. In other examples, the network entity may identify the packet type as an IKEv1 packet type, a WireGuard packet type, and/or any other packet type for any other authentication type.

At 506, the method may include the network entity determining whether authentication content for the packet matches known good criteria for the packet type of the authentication type based on one or more authentication rule(s)/signatures provided for the packet type of the authentication type. In at least one embodiment, the determination at 506 may include, as shown at 506a, determining whether of authentication content size of the packet is equal to a known good size for the packet type of the authentication type and/or whether the authentication content size is greater than or less than the known good size. In at least one embodiment, the determination at 506 may include, as shown at 506b, determining whether one or more authentication content parameters (e.g., nonce size, vendor ID, SNI, public key, etc.) of the packet match known good parameters for the packet type of the authentication type.

In some embodiments, authentication content size alone may be utilized to determine a match to an authentication rule/signature. In some embodiments, authentication content size in combination with one more authentication content parameter comparisons may be utilized to determine a match to an authentication rule/signature. In still some embodiments, a comparison of one or more authentication content parameters without a check of authentication content size may be utilized to determine a match to an authentication rule/signature (e.g., for WireGuard public key checks). Accordingly, any combination of checks can be envisioned for identifying valid authentication traffic may be utilized in accordance with embodiments herein.

Based on a determination at 506 that the authentication content of the packet does not match known good criteria for the packet type of the authentication type, the method may include the network entity dropping the packet and/or generating an alarm (e.g., flagging the packet, generating a drop log/drop log entry, etc.) for the packet, as shown at 510. However, based on a determination at 506 that the authentication content of the packet does match known good criteria for the packet type of the authentication type, the method may include the network entity permitting the packet, which may include any combination of processing the packet and/or forwarding the packet to another network entity, as shown at 508.

In summary, techniques described herein may allow a device and/or service in a network (which could be part of a VPN gateway itself, separate from the VPN gateway, within authenticator(s), etc.), to identify or distinguish known good authentication traffic of a given authentication type and allow/permit such traffic (to processed, forwarded, etc.) and deny and/or alert on all other authentication (e.g., IKEv2) traffic for the authentication type.

Referring to FIG. 6, FIG. 6 illustrates a hardware block diagram of a computing device 600 that may perform functions associated with VPN protection operations discussed herein in connection with the techniques depicted in FIGS. 1A-5. In various embodiments, a computing device, such as computing device 600 or any combination of computing devices 600, may be configured as any of firewall/IPS 150, VPN gateway 140, Linux host(s) 160, authenticator(s) 124 authentication rule generator 128, etc. as discussed for the techniques depicted in connection with FIGS. 1A-5.

It should be appreciated that FIG. 6 provides only an illustration of one embodiment and does not imply any limitations with regard to the environments in which different embodiments may be implemented. Many modifications to the depicted environment may be made.

As depicted, the computing device 600 includes a bus 612, which provides communications between computer processor(s) 614, memory 616, persistent storage 618, one or more communications units 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616, which may be inclusive of one or more memory element(s), includes random access memory (RAM) 624 and cache memory 626. In general, memory 616 can include any suitable volatile or non-volatile computer readable storage media. Instructions for control logic 640 may be stored in memory 616 and/or persistent storage 618 for execution by processor(s) 614.

When the processor(s) 614 execute control logic 640, policy combining logic 642, and/or policy enforcement logic 644, the processor(s) 614 are caused to perform the operations described above in connection with FIGS. 1A-5. For example, if computing device 600 is implemented as any of firewall/IPS 150, VPN gateway 140, authenticator(s) 124, or Linux host(s) 160 of the embodiment of FIG. 1A, the control logic 640 may be implemented as any of inspection logic or IP tables/eBPF rules such that when executing the control logic 640, the processor(s) 614 are cause to perform operations associated with obtaining a packet; determining that the packet is a packet type of an authentication type; determining whether authentication content for the packet matches known good criteria for the packet type of the authentication type; based on determining that the authentication content for the packet does not match the known good criteria, performing at least one of dropping the packet and generating an alarm; based on determining that the authentication content for the packet does match the known good criteria, processing the packet at the first network entity or forwarding the packet toward a second network entity; and/or any other operations as discussed for embodiments herein.

In another example, if computing device 600 is implemented as the authentication rule generator 128, executing the control logic 640 may cause processor(s) 614 to perform operations associated with obtaining a known good packet corresponding to a particular packet type of a particular authentication type; determining known good criteria for the known good packet in which the known good criteria is associated with authentication content for the known good packet generating one or more authentication rules for distinguishing the known good criteria for the packet type of the authentication type; and publishing the one or more authentication rules for one or more network entities of a VPN.

One or more programs and/or other logic may be stored in persistent storage 618 for execution by one or more of the respective computer processors 614 via one or more memory element(s) of memory 616. The persistent storage 618 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications units 620, in these examples, provides for communications with other data processing systems, networks, and/or devices. In these examples, each communications unit 620 may include at least one interface (IF) 621, which may facilitate communications with systems, networks, and/or devices utilizing any combination of cellular hardware, software, etc., wired hardware, software, etc. (e.g., network interface cards, etc.) to facilitate one or more connections for communications discussed herein. Accordingly, communications units 620 may provide communications through the use of any combination of physical and/or wireless communications links.

I/O interface(s) 622, may allow for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 930. Display 630 provides a mechanism to display data to a user and may be, for example, a computer monitor.

In one form, a computer-implemented method is provide that may include obtaining a packet at a first network entity; determining that the packet is a packet type of an authentication type; determining whether authentication content for the packet matches known good criteria for the packet type of the authentication type; based on determining that the authentication content for the packet does not match the known good criteria for the packet type of the authentication type, performing at least one of dropping the packet and generating an alarm; and based on determining that the authentication content for the packet does match the known good criteria for the packet type of the authentication type, processing the packet at the first network entity or forwarding the packet toward a second network entity.

The authentication type may be one of: Internet Key Exchange version 1 (IKEv1); Internet Key Exchange version 2 (IKEv2); Secure Sockets Layer (SSL) Transport Layer Security (TLS) or Datagram TLS (DTLS); and a virtual private network security protocol. In at least one instance, based on the authentication type being IKEv2, the packet type may be one of an IKE_SA_INIT packet; and an IKE_AUTH packet. In at least one instance, based on the authentication type being SSL TLS or DTLS, the packet type is a ClientHello packet.

The known good criteria for the packet type of the authentication type may include one or more of: a known good size of authentication content for the packet type of the authentication type; and one or more authentication content parameters for the packet type of the authentication type. In at least one instance, when the authentication type is Internet Key Exchange version 2 (IKEv2), the known good size of the authentication content may be based on one or more of: a cookie notification being included in the authentication content; an encapsulation type for the packet; and a fragment number for the packet. In at least one instance, the one or more authentication content parameters for the packet type of the authentication type may include one or more of: a known good nonce size of the packet type for the authentication type; and a vendor identifier payload of the packet type for the authentication type. In at least one instance, when the authentication type is Secure Sockets Layer (SSL) Transport Layer Security (TLS) or Datagram TLS (DTLS), the one or more authentication content parameters of the authentication content include at least one of a Server Name value and a type of encryption supported.

In at least one instance, the method may further include obtaining a known good packet corresponding to a particular packet type of a particular authentication type; determining known good criteria for the known good packet, wherein the known good criteria is associated with authentication content for the known good packet generating one or more authentication rules for distinguishing the known good criteria for the packet type of the authentication type; and publishing the authentication rule for one or more network entities, which include the first network entity.

In various instances, the one or more authentication rules may include one or more of: an authentication rule usable to determine whether a size of authentication content is equal to a known good size of authentication content for the known good packet; one or more authentication rules usable to determine whether a size of authentication content is greater than or less than a known good size of the authentication content for the known good packet; and one or more authentication rules usable to determine whether one or more authentication content parameters match known good parameters of the authentication content for the known good packet.

The one or more network entities may include one or more of: a Virtual Private Network (VPN) entity a firewall entity; an intrusion prevention system; a Linux host; and an authentication entity for a particular authentication type.

In one form, a computer-implemented method may be provided that may include dropping non-legitimate IKE traffic by taking a snapshot of legitimate traffic and noting the size of the IP header and attributes of the IKE header to identify IKE_SA_INIT and IKE_AUTH messages, then creating firewall/filtering rules to drop any non-legitimate IKE traffic that is specific to the attributes in the IKE header and does not meet the known size of the IP header. In one form, a computer implemented method may be provided that may include efficiently detecting and dropping encrypted non-legitimate IKE traffic (as described above) without having to perform any form of decryption by network or host devices. In one form, a computer-implemented method may be provided to efficiently detect and drop encrypted non-legitimate IKE traffic (as described above), which uses attributes in the IKE header such as the nonce size or vendor ID to create filtering rules. In one form, a computer-implemented method may be provided to to efficiently detect and drop encrypted non-legitimate IKE traffic (as described in above) without having to perform any form of artificial intelligence or machine learning. In one form, a computer-implemented method may be provided to efficiently detect and drop encrypted non-legitimate IKE traffic (as described above), without having to detect abuse of a vulnerability. In one form, a computer-implemented method may be provided to efficiently detect and drop encrypted non-legitimate IKE traffic (as described above), which can be implemented using filtering rules that inspect application layer protocols (IKE) on network devices to perform actions such as dropping non-legitimate traffic. In one form, a computer-implemented method may be provided to efficiently detect and drop encrypted non-legitimate IKE traffic (as described above), which can be implemented in hardware or software. In one form, a computer-implemented method may be provided to efficiently detect and drop encrypted non-legitimate IKE traffic (as described above), which could be separate or an integrated component of a VPN gateway.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system.

Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration.

The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining a packet at a first network entity;
   determining that the packet is a packet type of an authentication type based on authentication content corresponding to the authentication type being contained in the packet, wherein the authentication content comprises an authentication header and authentication data;
   determining whether the authentication content for the packet matches known good criteria for the packet type of the authentication type;
   based on determining that the authentication content for the packet does not match the known good criteria for the packet type of the authentication type, performing at least one of dropping the packet and generating an alarm; and
   based on determining that the authentication content for the packet does match the known good criteria for the packet type of the authentication type, processing the packet at the first network entity or forwarding the packet toward a second network entity.

2. The method of claim 1, wherein the authentication type is one of:
   Internet Key Exchange version 1 (IKEv1);
   Internet Key Exchange version 2 (IKEv2);
   Secure Sockets Layer (SSL) Transport Layer Security (TLS) or Datagram TLS (DTLS); and
   a virtual private network security protocol.

3. The method of claim 2, wherein based on the authentication type being IKEv2, the packet type is one of:
   an IKE_SA_INIT packet; and
   an IKE_AUTH packet.

4. The method of claim 2, wherein based on the authentication type being SSL TLS or DTLS, the packet type is a ClientHello packet.

5. The method of claim 1, wherein the known good criteria for the packet type of the authentication type includes one or more of:
   a known good size of authentication content for the packet type of the authentication type; and
   one or more authentication content parameters for the packet type of the authentication type.

6. The method of claim 5, wherein when the authentication type is Internet Key Exchange version 2 (IKEv2), the known good size of the authentication content is based on one or more of:
   a cookie notification being included in the authentication content;
   an encapsulation type for the packet; and
   a fragment number for the packet.

7. The method of claim 5, wherein the one or more authentication content parameters for the packet type of the authentication type include one or more of:
   a known good nonce size of the packet type for the authentication type; and
   a vendor identifier payload of the packet type for the authentication type.

8. The method of claim 5, wherein when the authentication type is Secure Sockets Layer (SSL) Transport Layer Security (TLS) or Datagram TLS (DTLS), the one or more authentication content parameters of the authentication content include at least one of a Server Name value and a type of encryption supported.

9. The method of claim 1, further comprising:
obtaining a known good packet corresponding to a particular packet type of a particular authentication type;
determining known good criteria for the known good packet, wherein the known good criteria is associated with authentication content for the known good packet;
generating one or more authentication rules for distinguishing the known good criteria for the packet type of the authentication type; and
publishing the one or more authentication rules for one or more network entities, which include the first network entity.

10. The method of claim 9, wherein the one or more authentication rules comprise one or more of:
an authentication rule usable to determine whether a size of authentication content is equal to a known good size of authentication content for the known good packet;
one or more authentication rules usable to determine whether a size of authentication content is greater than or less than a known good size of the authentication content for the known good packet; and
one or more authentication rules usable to determine whether one or more authentication content parameters match known good parameters of the authentication content for the known good packet.

11. The method of claim 9, wherein the one or more network entities include one or more of:
a Virtual Private Network (VPN) entity;
a firewall entity;
an intrusion prevention system;
a Linux host; and
an authentication entity for a particular authentication type.

12. One or more non-transitory computer readable storage media encoded with instructions that, when executed by a processor, cause the processor to perform operations, comprising:
obtaining a packet at a first network entity;
determining that the packet is a packet type of an authentication type based on authentication content corresponding to the authentication type being contained in the packet, wherein the authentication content comprises an authentication header and authentication data;
determining whether the authentication content for the packet matches known good criteria for the packet type of the authentication type;
based on determining that the authentication content for the packet does not match the known good criteria for the packet type of the authentication type, performing at least one of dropping the packet and generating an alarm; and
based on determining that the authentication content for the packet does match the known good criteria for the packet type of the authentication type, processing the packet at the first network entity or forwarding the packet toward a second network entity.

13. The media of claim 12, wherein the authentication type is one of:
Internet Key Exchange version 1 (IKEv1);
Internet Key Exchange version 2 (IKEv2);
Secure Sockets Layer (SSL) Transport Layer Security (TLS) or Datagram TLS (DTLS); and
a virtual private network security protocol.

14. The media of claim 12, wherein the known good criteria for the packet type of the authentication type includes one or more of:
a known good size of authentication content for the packet type of the authentication type; and
one or more authentication content parameters for the packet type of the authentication type.

15. The media of claim 14, wherein when the authentication type is Internet Key Exchange version 2 (IKEv2), the known good size of the authentication content is based on one or more of:
a cookie notification being included in the authentication content;
an encapsulation type for the packet; and
a fragment number for the packet.

16. A system comprising:
at least one memory element for storing data; and
at least one processor for executing instructions associated with the data, wherein executing the instructions causes the system to perform operations, comprising:
obtaining a packet at a first network entity;
determining that the packet is a packet type of an authentication type based on authentication content corresponding to the authentication type being contained in the packet, wherein the authentication content comprises an authentication header and authentication data;
determining whether the authentication content for the packet matches known good criteria for the packet type of the authentication type;
based on determining that the authentication content for the packet does not match the known good criteria for the packet type of the authentication type, performing at least one of dropping the packet and generating an alarm; and
based on determining that the authentication content for the packet does match the known good criteria for the packet type of the authentication type, processing the packet at the first network entity or forwarding the packet toward a second network entity.

17. The system of claim 16, wherein the authentication type is one of:
Internet Key Exchange version 1 (IKEv1);
Internet Key Exchange version 2 (IKEv2);
Secure Sockets Layer (SSL) Transport Layer Security (TLS) or Datagram TLS (DTLS); and
a virtual private network security protocol.

18. The system of claim 16, wherein the known good criteria for the packet type of the authentication type includes one or more of:
a known good size of authentication content for the packet type of the authentication type; and
one or more authentication content parameters for the packet type of the authentication type.

19. The system of claim 18, wherein when the authentication type is Internet Key Exchange version 2 (IKEv2), the known good size of the authentication content is based on one or more of:
a cookie notification being included in the authentication content;
an encapsulation type for the packet; and
a fragment number for the packet.

20. The system of claim 16, the operations further comprising:
obtaining a known good packet corresponding to a particular packet type of a particular authentication type;
determining known good criteria for the known good packet, wherein the known good criteria is associated with authentication content for the known good packet;

generating one or more authentication rules for distinguishing the known good criteria for the packet type of the authentication type; and publishing the one or more authentication rules for one or more network entities, which include the first network entity.

\* \* \* \* \*

UNITED STATES PATENT AND TRADEMARK OFFICE
CERTIFICATE OF CORRECTION

PATENT NO. : 11,558,354 B2
APPLICATION NO. : 16/849251
DATED : January 17, 2023
INVENTOR(S) : Kyle Mestery et al.

It is certified that error appears in the above-identified patent and that said Letters Patent is hereby corrected as shown below:

On the Title Page

Item (30) Foreign Application Priority Data:
Please replace "1905405" with --1905405.5--

Signed and Sealed this
Twenty-eighth Day of February, 2023

Katherine Kelly Vidal
Director of the United States Patent and Trademark Office